(12) United States Patent
Matsuda et al.

(10) Patent No.: US 11,576,155 B2
(45) Date of Patent: Feb. 7, 2023

(54) COMMUNICATION APPARATUS, COMMUNICATION METHOD, AND PROGRAM

(71) Applicant: Sony Corporation, Tokyo (JP)

(72) Inventors: Hiroki Matsuda, Tokyo (JP); Naoki Kusashima, Kanagawa (JP); Kazuyuki Shimezawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/492,611

(22) PCT Filed: Jan. 31, 2018

(86) PCT No.: PCT/JP2018/003057
§ 371 (c)(1),
(2) Date: Sep. 10, 2019

(87) PCT Pub. No.: WO2018/173489
PCT Pub. Date: Sep. 27, 2018

(65) Prior Publication Data
US 2020/0053711 A1  Feb. 13, 2020

(30) Foreign Application Priority Data
Mar. 23, 2017  (JP) .............................. JP2017-057998

(51) Int. Cl.
*H04W 72/04* (2009.01)
*H04W 68/00* (2009.01)
*H04W 72/10* (2009.01)

(52) U.S. Cl.
CPC ..... *H04W 72/0406* (2013.01); *H04W 68/005* (2013.01); *H04W 72/10* (2013.01); *H04W 72/044* (2013.01)

(58) Field of Classification Search
CPC ............... H04W 68/005; H04W 72/10; H04W 72/0406; H04W 72/044
(Continued)

(56) References Cited

U.S. PATENT DOCUMENTS 10,492,222 B2 *  11/2019  Kim .................... H04L 5/001
2012/0051220 A1 *  3/2012  Nabetani ........... H04W 74/0816
370/235

(Continued)

FOREIGN PATENT DOCUMENTS

CN  106452708 A  2/2017
EP  3369283 B1 *  11/2019  ........ H04W 72/1294
(Continued)

OTHER PUBLICATIONS

Amsatou Mbengue and Yongyu Chang, "LBT Enhancement for LTE-LAA Fair Coexistence". (Year: 2017).*
(Continued)

*Primary Examiner* — Intekhaab A Siddiquee
(74) *Attorney, Agent, or Firm* — Xsensus LLP

(57) ABSTRACT

To implement low-delay and highly reliable communication in a more suitable manner.
A communication apparatus including: a control unit that performs control such that data are transmitted to a transmission destination via at least any one of a plurality of channels shared in communication with each of a plurality of apparatuses; and a determination unit that determines whether or not the plurality of channels is available for transmission of the same data, in which the control unit performs control such that in a case where at least one of the plurality of channels has continued to be available for data transmission beyond a period set for the channel, data are transmitted by use of the channel.

16 Claims, 18 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2013/0064191 | A1* | 3/2013 | Jeong | ...................... H04L 5/001 |
| | | | | 370/329 |
| 2017/0339717 | A1* | 11/2017 | Futaki | ................... H04W 16/14 |
| 2019/0281636 | A1* | 9/2019 | Liu | ................... H04W 72/0446 |

FOREIGN PATENT DOCUMENTS

| | | | | | |
|---|---|---|---|---|---|
| EP | 3703326 | A1 | * | 9/2020 | ........ H04W 74/0808 |
| JP | 2005295499 | A | | 10/2005 | |
| JP | 2010-130280 | A | | 6/2010 | |
| JP | 2020-10075 | A | * | 11/2016 | ........ H04W 74/0833 |
| JP | 2018511988 | A | | 4/2018 | |
| WO | 2016/103533 | A1 | | 6/2016 | |
| WO | 2016/148634 | A2 | | 9/2016 | |
| WO | WO-2016149202 | A1 | | 9/2016 | |
| WO | WO-2017030491 | A | * | 2/2017 | ............ H04W 24/02 |
| WO | WO-2017030603 | A1 | * | 2/2017 | ......... H04L 27/0006 |
| WO | WO-2017047973 | A1 | * | 3/2017 | ............. H04L 5/001 |

OTHER PUBLICATIONS

Ananth V. Kini, Loic Canonne-Velasquez, Mohsen Hosseinian, Marian Rudolf, Janet Stern-Berkowitz, "Wi-Fi-LAA Coexistence: Design and Evaluation of Listen Before Talk for LAA" (Year: 2016).*

International Search Report and Written Opinion dated Apr. 24, 2018 for PCT/JP2018/003057 filed on Jan. 31, 2018, 9 pages including English Translation of the International Search Report.

3GPP, "3rd Generation Partnership Project; Technical Specification Group Radio Access Network; Evolved Universal Terrestrial Radio Access (E-UTRA); Physical layer procedures", Release 13, 3GPP TS 36.213 V13.4.0, Section 15, Dec. 2016, pp. 351-356.

Extended European Search Report dated Feb. 17, 2020, issued in corresponding European Patent Application No. 18770527.2.

* cited by examiner

FIG. 6

| | SUBCARRIER SPACING | NUMBER OF SUBCARRIERS PER RESOURCE BLOCK IN NR CELL | NUMBER OF SYMBOLS PER SUBFRAME | CP-LENGTH TYPE |
|---|---|---|---|---|
| PARAMETER SET 0 | 15 kHz | 12 | 14 | TYPE 1 |
| PARAMETER SET 1 | 7.5 kHz | 24 | 7 | TYPE 1 |
| PARAMETER SET 2 | 30 kHz | 6 | 28 | TYPE 1 |
| PARAMETER SET 3 | 15 kHz | 12 | 12 | TYPE 2 |
| ... | ... | ... | ... | ... |

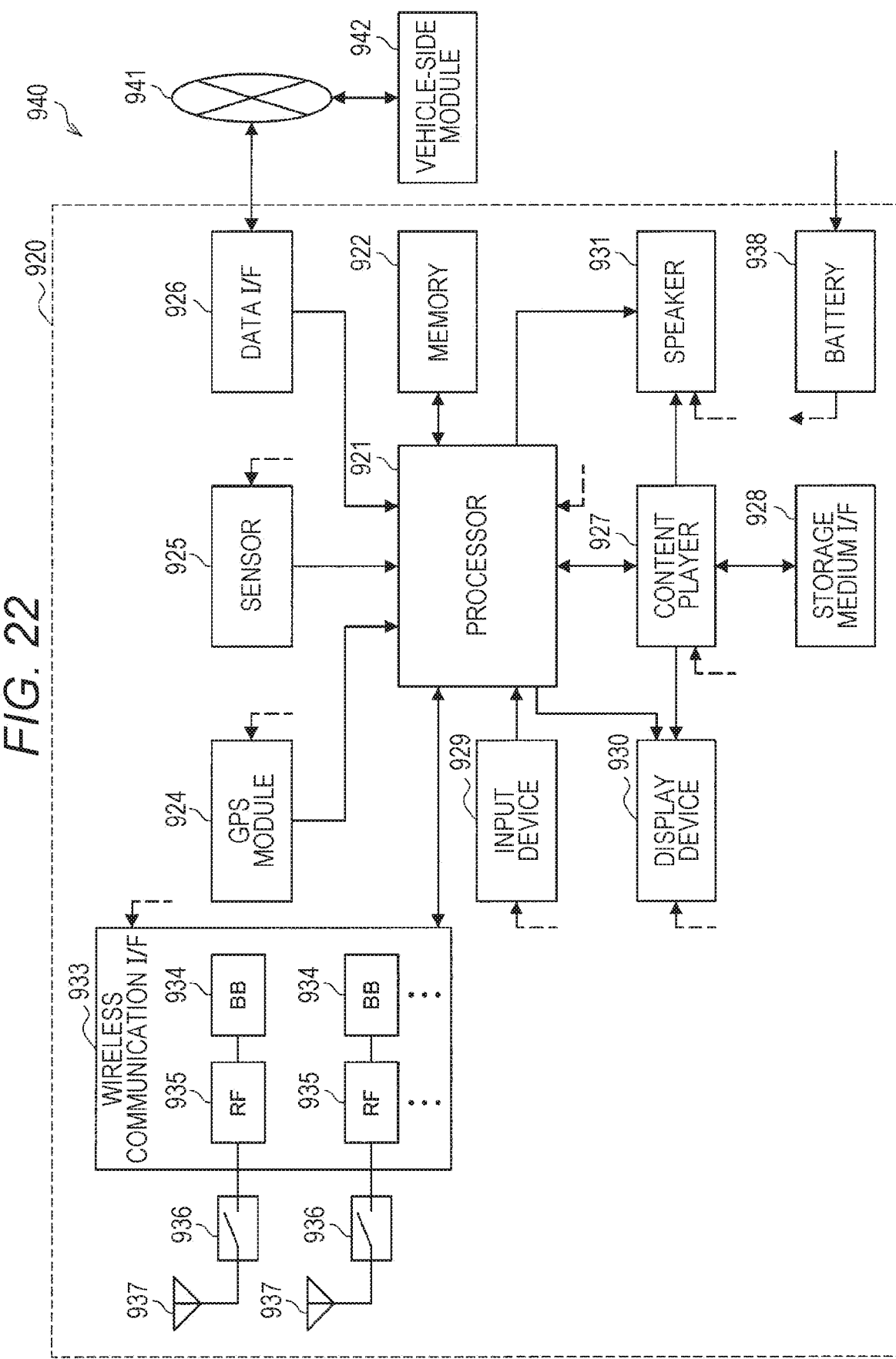

COMMUNICATION APPARATUS, COMMUNICATION METHOD, AND PROGRAM

CROSS-REFERENCE TO RELATED APPLICATIONS

The present application is based on PCT filing PCT/JP2018/003057, filed Jan. 31, 2018, which claims priority to JP 2017-057998, filed Mar. 23, 2017, the entire contents of each are incorporated herein by reference.

TECHNICAL FIELD

The present disclosure relates to a communication apparatus, a communication method, and a program.

BACKGROUND ART

A wireless access method and a wireless network for cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") are under discussion in the 3rd Generation Partnership Project (3GPP). Note that LTE includes LTE-A, LTE-A Pro, and EUTRA, and NR includes the fifth-generation mobile wireless communication (5G), NRAT, and FEUTRA in the following description. In LTE and NR, a base station apparatus (base station) is also referred to as an evolved Node B (eNodeB), and a terminal apparatus (mobile station, mobile station apparatus, or terminal) is also referred to as user equipment (UE). LTE and NR are each a cellular communication system in which a plurality of areas covered by a base station apparatus is arranged in a cell-like manner. A single base station apparatus may manage a plurality of cells.

NR is a next-generation wireless access method to replace LTE, and is a radio access technology (RAT) different from LTE. NR is an access technology that can be applied to various use cases including enhanced mobile broadband (eMBB), massive machine type communications (mMTC), and ultra reliable and low latency communications (URLLC). NR is studied with a view to achieving a technology framework for dealing with usage scenarios, requirements, deployment scenarios, and the like in those use cases. Details of operation in an unlicensed band, which is one of the use cases, are disclosed in, for example, Non-Patent Document 1.

CITATION LIST

Non-Patent Document

Non-Patent Document 1: 3GPP, TS 36.213, Section 15, "Physical layer procedures," December, 2016.

SUMMARY OF THE INVENTION

Problems to be Solved by the Invention

Incidentally, there are cases where NR requires communication with lower delay and higher reliability than LTE. In particular, NR is assumed to be used in various use cases. Therefore, there is a demand for providing a technique capable of allowing flexible design according to the use cases and thus enhancing transmission efficiency of the entire system.

Accordingly, the present disclosure proposes a technique capable of implementing low-delay and highly reliable communication in a more suitable manner.

Solutions to Problems

According to the present disclosure, there is provided a communication apparatus including: a control unit that performs control such that data are transmitted to a transmission destination via at least any one of a plurality of channels shared in communication with each of a plurality of apparatuses; and a determination unit that determines whether or not the plurality of channels is available for transmission of the same data, in which the control unit performs control such that in a case where at least one of the plurality of channels has continued to be available for data transmission beyond a period set for the channel, data are transmitted by use of the channel.

Furthermore, according to the present disclosure, there is provided a communication method to be performed by a computer, including: performing control such that data are transmitted to a transmission destination via at least any one of a plurality of channels shared in communication with each of a plurality of apparatuses; determining whether or not the plurality of channels is available for transmission of the same data; and performing control such that in a case where at least one of the plurality of channels has continued to be available for data transmission beyond a period set for the channel, data are transmitted by use of the channel.

In addition, according to the present disclosure, there is provided a program for causing a computer to perform functions of: performing control such that data are transmitted to a transmission destination via at least any one of a plurality of channels shared in communication with each of a plurality of apparatuses; determining whether or not the plurality of channels is available for transmission of the same data; and performing control such that in a case where at least one of the plurality of channels has continued to be available for data transmission beyond a period set for the channel, data are transmitted by use of the channel.

Effects of the Invention

As described above, according to the present disclosure, there is provided a technique capable of implementing low-delay and highly reliable communication in a more suitable manner.

Note that the above-described effect is not necessarily restrictive, and any of the effects set forth in the present specification or another effect that can be derived from the present specification may be achieved together with or instead of the above-described effect.

BRIEF DESCRIPTION OF DRAWINGS

FIG. 6 is a diagram showing examples of parameter sets related to transmission signals in an NR cell.

FIG. 22 is a block diagram showing an example of a schematic configuration of a car navigation apparatus.

MODE FOR CARRYING OUT THE INVENTION

Figure 1:
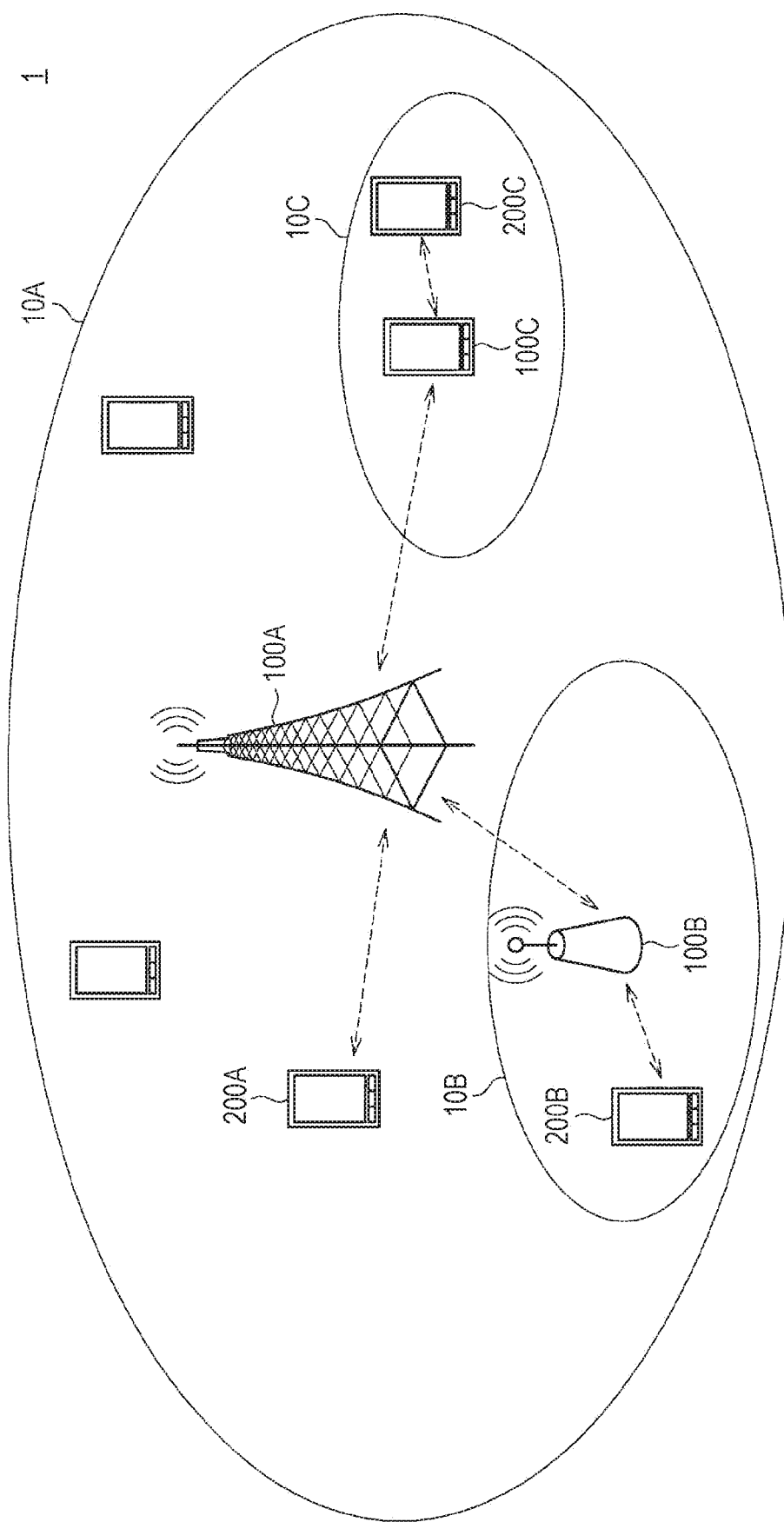
FIG. 1 is an explanatory diagram for describing an example of a schematic configuration of a system according to an embodiment of the present disclosure.

A preferred embodiment of the present disclosure will be described in detail below with reference to the accompanying drawings. Note that in the present specification and the drawings, the same reference numerals are assigned to constituent elements having substantially the same functional configurations, and redundant description will be thus omitted.

Note that description will be provided in the following order.

1. Configuration Examples
1.1. Example of System Configuration
1.2. Example of Configuration of Base Station
1.3. Example of Configuration of Terminal Apparatus
2. Technical Features
3. Application Examples
3.1. Application Examples related to Base Station
3.2. Application Examples related to Terminal Apparatus
4. Conclusion 1. Configuration Examples 1.1. Example of System Configuration First, an example of a schematic configuration of a system 1 according to an embodiment of the present disclosure will be described with reference to FIG. 1. FIG. 1 is an explanatory diagram for describing the example of the schematic configuration of the system 1 according to the embodiment of the present disclosure. As shown in FIG. 1, the system 1 includes a wireless communication apparatus 100 and a terminal apparatus 200. Here, the terminal apparatus 200 is also referred to as a user. The user may also be referred to as a UE. A wireless communication apparatus 100C is also referred to as a UE-Relay. Here, the UE may be a UE defined in LTE or LTE-A. In addition, the UE-Relay may be a Prose UE to Network Relay which is under discussion in 3GPP, or may more generally refer to a communication device.

(1) Wireless Communication Apparatus 100

The wireless communication apparatus 100 is an apparatus that provides wireless communication services to subordinate devices. For example, a wireless communication apparatus 100A is a base station of a cellular system (or a mobile communication system). The base station 100A performs wireless communication with an apparatus (for example, a terminal apparatus 200A) located inside a cell 10A of the base station 100A. For example, the base station 100A transmits a downlink signal to the terminal apparatus 200A, and receives an uplink signal from the terminal apparatus 200A.

The base station 100A is logically connected to another base station through, for example, an X2 interface, and can transmit and receive control information and the like. Furthermore, the base station 100A is logically connected to a so-called core network (not shown) through, for example, an S1 interface, and can transmit and receive control information and the like. Note that communication between these apparatuses can be physically relayed by various devices.

Here, the wireless communication apparatus 100A shown in FIG. 1 is a macrocell base station. The cell 10A shown in FIG. 1 is a macrocell. Meanwhile, a wireless communication apparatus 100B and the wireless communication apparatus 100C are master devices that operate small cells 10B and 10C, respectively. As an example, the master device 100B is a small cell base station provided in such a manner as to be fixed. The small cell base station 100B establishes a wireless backhaul link with the macrocell base station 100A, and also establishes an access link with one or more terminal apparatuses (for example, terminal apparatuses 200B) in the small cell 10B. Note that the wireless communication apparatus 100B may be a relay node defined by 3GPP. The master device 100C is a dynamic access point (AP). The dynamic AP 100C is a mobile device that operates the small cell 10C dynamically. The dynamic AP 100C establishes a wireless backhaul link with the macrocell base station 100A, and also establishes an access link with one or more terminal apparatuses (for example, terminal apparatuses 200C) in the small cell 10C. The dynamic AP 100C may be a terminal apparatus equipped with hardware or software that can operate as, for example, a base station or a wireless access point. The small cell 10C in this case is a localized network (virtual cell) dynamically formed.

For example, the cell 10A may be operated according to any wireless communication system such as LTE, LTE-Advanced (LTE-A), LTE-ADVANCED PRO, GSM (registered trademark), UMTS, W-CDMA, CDMA2000, WiMAX, WiMAX 2, or IEEE 802.16.

Note that the small cell is a concept that may include various types of cell smaller than a macrocell (for example, femtocell, nanocell, picocell, microcell, and the like) to be arranged with an overlap or without an overlap with the macrocell. In one example, a small cell is operated by a dedicated base station. In another example, a terminal serving as a master device operates a small cell by temporarily operating as a small cell base station. A so-called relay node can also be regarded as a form of small cell base station. A wireless communication apparatus functioning as a master station of a relay node is also referred to as a donor base station. The donor base station may refer to a DeNB in LTE, or may more generally refer to the master station of a relay node.

(2) Terminal Apparatus 200

The terminal apparatus 200 can communicate in the cellular system (or mobile communication system). The terminal apparatus 200 performs wireless communication with a wireless communication apparatus (for example, the base station 100A, or the master device 100B or 100C) of the cellular system. For example, the terminal apparatus 200A receives the downlink signal from the base station 100A, and transmits the uplink signal to the base station 100A.

Furthermore, not only so-called UEs but also, for example, so-called low cost UEs such as an MTC terminal, an enhanced MTC (eMTC) terminal, and an NB-IoT terminal, may be applied as the terminal apparatuses 200.

(3) Supplement

The schematic configuration of the system 1 has been described above. However, the present technology is not limited to the example shown in FIG. 1. For example, a configuration including no master device, Small Cell Enhancement (SCE), a Heterogeneous Network (HetNet), an MTC network, or the like may be adopted as a configuration of the system 1. Furthermore, as another example of the configuration of the system 1, a master device may be connected to a small cell such that a cell is constructed under the small cell.

1.2. Example of Configuration of Base Station

Figure 2:
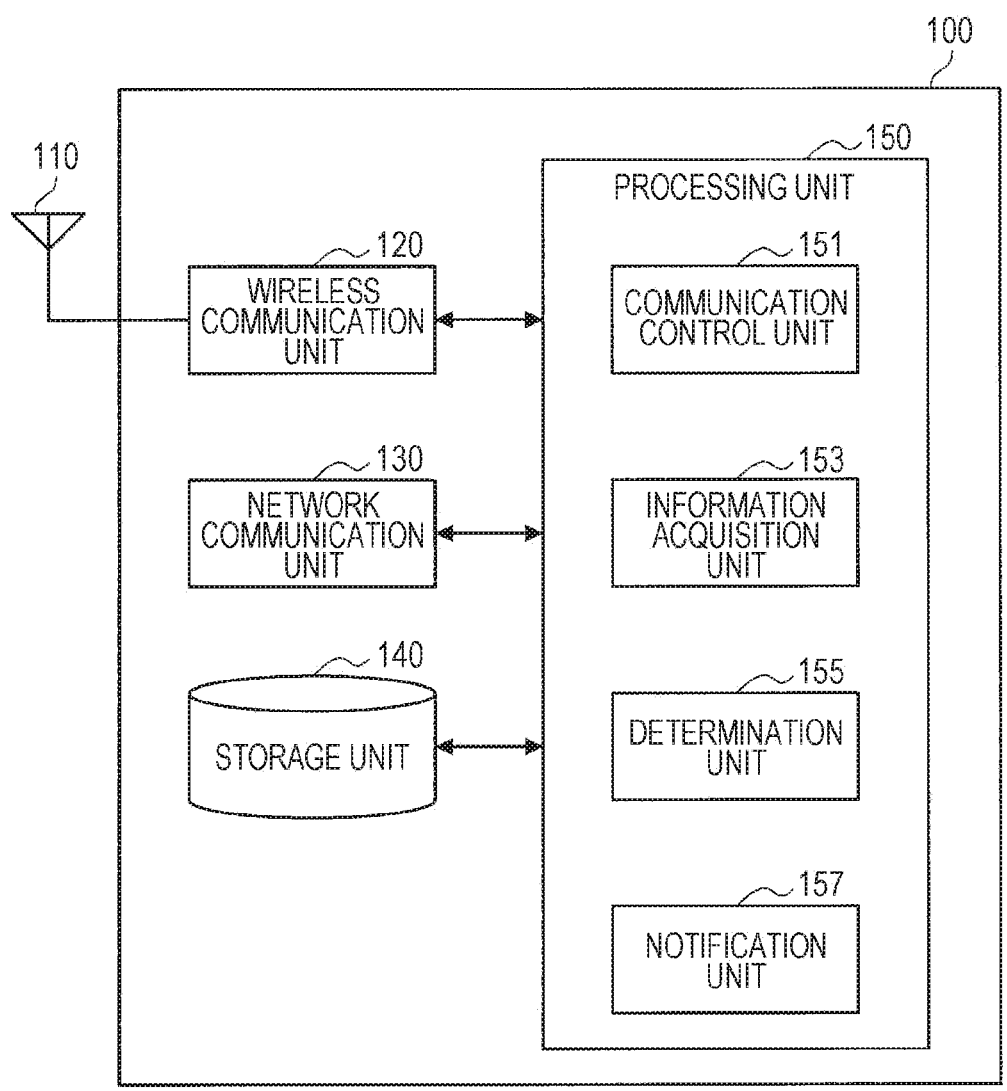
FIG. 2 is a block diagram showing an example of a configuration of a base station according to the same embodiment.

Next, a configuration of the base station 100 according to the embodiment of the present disclosure will be described with reference to FIG. 2. FIG. 2 is a block diagram showing an example of the configuration of the base station 100 according to the embodiment of the present disclosure. Referring to FIG. 2, the base station 100 includes an antenna unit 110, a wireless communication unit 120, a network communication unit 130, a storage unit 140, and a processing unit 150.

(1) Antenna Unit 110

The antenna unit 110 emits a signal output from the wireless communication unit 120, as radio waves in the air. Furthermore, the antenna unit 110 converts radio waves in the air into a signal, and outputs the signal to the wireless communication unit 120.

(2) Wireless Communication Unit 120. The wireless communication unit 120 transmits and receives signals. For example, the wireless communication unit 120 transmits a downlink signal to a terminal apparatus, and receives an uplink signal from the terminal apparatus.

Furthermore, as described above, there are cases where a terminal apparatus operates as a relay terminal (the wireless communication apparatus 100C in FIG. 1) to relay communication between a remote terminal (the terminal apparatus 200C in FIG. 1) and the base station in the system 1 according to the present embodiment. In such a case, the wireless communication unit 120 in, for example, the wireless communication apparatus 100C corresponding to the relay terminal may transmit/receive sidelink signals to/from the remote terminal.

(3) Network Communication Unit 130

The network communication unit 130 transmits and receives information. For example, the network communication unit 130 transmits information to other nodes, and receives information from other nodes. Examples of the other nodes described above include another base station and a core network node.

Note that, as described above, there are cases where a terminal apparatus operates as a relay terminal to relay communication between a remote terminal and the base station in the system 1 according to the present embodiment. In such a case, for example, the wireless communication apparatus 100C corresponding to the relay terminal need not include the network communication unit 130.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a communication control unit 151, an information acquisition unit 153, a determination unit 155, and a notification unit 157. Note that the processing unit 150 may further include a constituent element other than these constituent elements. In other words, the processing unit 150 can also perform operation other than the operation of these constituent elements.

The operation of the communication control unit 151, the information acquisition unit 153, the determination unit 155, and the notification unit 157 will be described in detail later.

1.3. Example of Configuration of Terminal Apparatus

Figure 3:
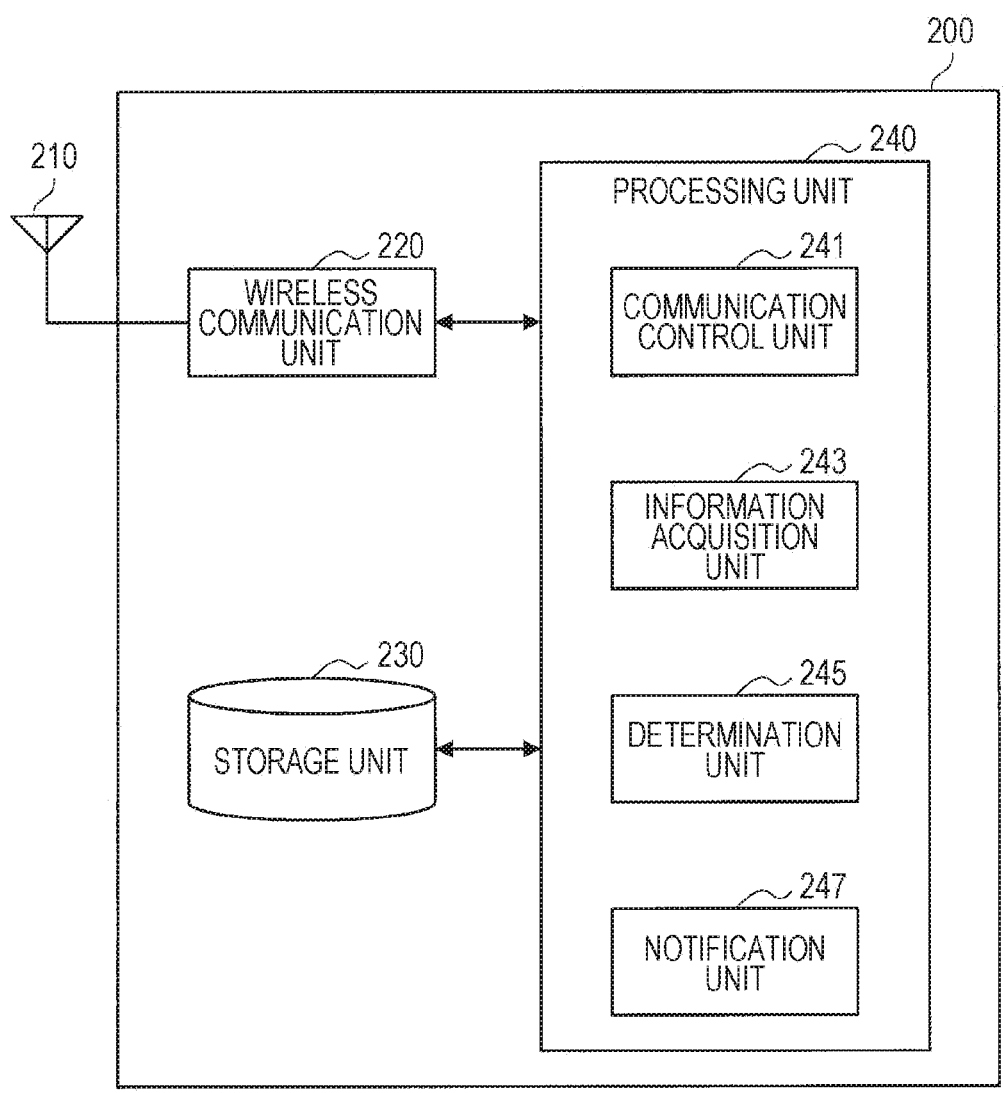
FIG. 3 is a block diagram showing an example of a configuration of a terminal apparatus according to the same embodiment.

Next, an example of a configuration of the terminal apparatus 200 according to the embodiment of the present disclosure will be described with reference to FIG. 3. FIG. 3 is a block diagram showing the example of the configuration of the terminal apparatus 200 according to the embodiment of the present disclosure. As shown in FIG. 3, the terminal apparatus 200 includes an antenna unit 210, a wireless communication unit 220, a storage unit 230, and a processing unit 240.

(1) Antenna Unit 210

The antenna unit 210 emits a signal output from the wireless communication unit 220, as radio waves in the air. Furthermore, the antenna unit 210 converts radio waves in the air into a signal, and outputs the signal to the wireless communication unit 220.

(2) Wireless Communication Unit 220

The wireless communication unit 220 transmits and receives signals. For example, the wireless communication unit 220 receives a downlink signal from a base station, and transmits an uplink signal to the base station.

Furthermore, as described above, there are cases where a terminal apparatus operates as a relay terminal to relay communication between a remote terminal and the base station in the system 1 according to the present embodiment. In such a case, the wireless communication unit 220 in, for example, the terminal apparatus 200C operating as the remote terminal may transmit/receive sidelink signals to/from the relay terminal.

(3) Storage Unit 230

The storage unit 230 temporarily or permanently stores a program and various data for operation of the terminal apparatus 200.

(4) Processing Unit 240

The processing unit 240 provides various functions of the terminal apparatus 200. For example, the processing unit 240 includes a communication control unit 241, an information acquisition unit 243, a determination unit 245, and a notification unit 247. Note that the processing unit 240 may further include a constituent element other than these constituent elements. In other words, the processing unit 240 can also perform operation other than the operation of these constituent elements.

The operation of the communication control unit 241, the information acquisition unit 243, the determination unit 245, and the notification unit 247 will be described in detail later.

2. Technical Features

Next, the following describes technical features of the system according to the embodiment of the present disclosure.

<Radio Access Technology>

In the present embodiment, the base station 100 and the terminal apparatus 200 each support one or more radio access technologies (RATs). For example, a RAT includes LTE and NR. A single RAT corresponds to a single cell (component carrier). In other words, in a case where a plurality of RATs is supported, the RATs correspond to respective different cells. In the present embodiment, a cell is a combination of a downlink resource, an uplink resource, and/or a sidelink. Furthermore, a cell corresponding to LTE is referred to as an LTE cell, and a cell corresponding to NR is referred to as an NR cell in the following description.

Downlink communication is communication from the base station 100 to the terminal apparatus 200. Uplink communication is communication from the terminal apparatus 200 to the base station 100. Sidelink communication is communication from the terminal apparatus 200 to another terminal apparatus 200.

Sidelink communication is defined for proximity direct detection and proximity direct communication between terminal apparatuses. Sidelink communication can use a frame configuration similar to frame configurations of uplink communication and downlink communication. Furthermore, sidelink communication may be limited to a subset of uplink resources and/or downlink resources.

The base station 100 and the terminal apparatus 200 can support communication using a set of one or more cells in the downlink, uplink, and/or sidelink. A set of multiple cells is also referred to as carrier aggregation or dual connectivity. Details of carrier aggregation and dual connectivity will be described later. Furthermore, each cell uses a predetermined frequency bandwidth. It is possible to predefine a maximum value, a minimum value, and values that can be set in the predetermined frequency bandwidth.

Figure 4:
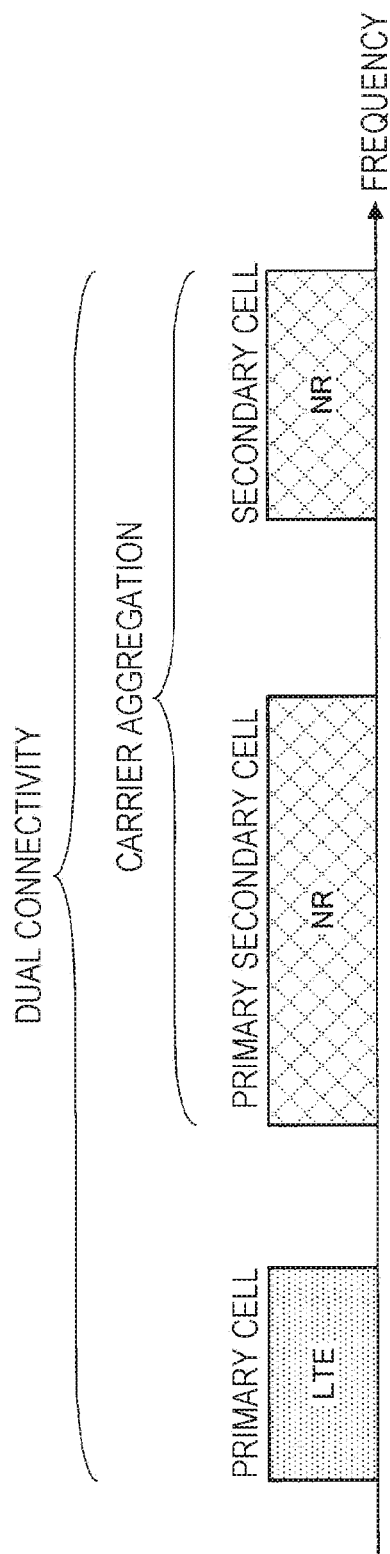
FIG. 4 is a diagram showing an example of the setting of a component carrier in the same embodiment.

FIG. 4 is a diagram showing an example of the setting of a component carrier in the present embodiment. A single LTE cell and two NR cells are set in the example of FIG. 4. The single LTE cell is set as a primary cell. The two NR cells are set as a primary secondary cell and a secondary cell, respectively. The two NR cells are integrated by carrier aggregation. Furthermore, the LTE cell and the NR cells are integrated by dual connectivity. Note that the LTE cell and the NR cells may be integrated by carrier aggregation. In the example of FIG. 4, the LTE cell which is the primary cell can assist NR in establishing connection. Therefore, it is not necessary to support some functions such as functions for communicating in a stand-alone state. The functions for communicating in a stand-alone state include a function necessary for initial connection.

Figure 5:
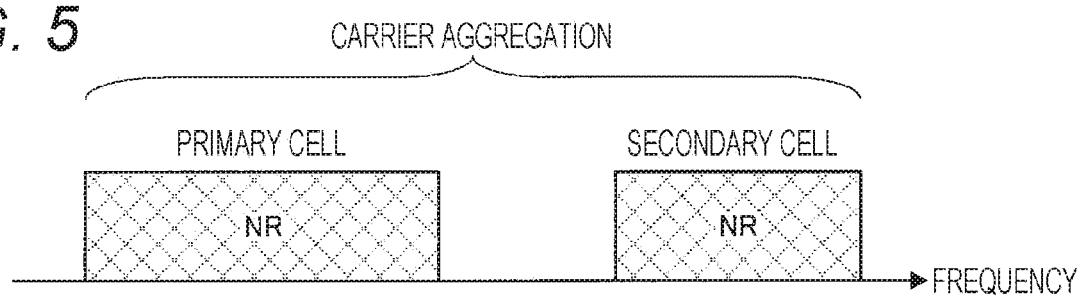
FIG. 5 is a diagram showing an example of the setting of a component carrier in the same embodiment.

FIG. 5 is a diagram showing an example of the setting of a component carrier in the present embodiment. Two NR cells are set in the example of FIG. 5. The two NR cells are set as a primary cell and a secondary cell, respectively, and are integrated by carrier aggregation. In this case, since the NR cells support the functions for communicating in a stand-alone state, assistance of an LTE cell is not necessary. Note that the two NR cells may be integrated by dual connectivity.

<Frame Configuration of NR in Present Embodiment>

In each of the NR cells, one or more predetermined parameters are used in a certain predetermined time length (for example, a subframe). In other words, a downlink signal and an uplink signal are each generated by use of one or more predetermined parameters in the predetermined time length in the NR cell. In other words, the terminal apparatus 200 is based on the assumption that a downlink signal to be transmitted from the base station 100 and an uplink signal to be transmitted to the base station 100 are each generated by use of one or more predetermined parameters in the predetermined time length. Furthermore, it is possible to configure the base station 100 such that the downlink signal to be transmitted to the terminal apparatus 200 and the uplink signal to be transmitted from the terminal apparatus 200 are each generated by use of one or more predetermined parameters in the predetermined time length. In a case where a plurality of predetermined parameters is used, signals generated by use of those predetermined parameters are multiplexed by a predetermined method. The predetermined method includes, for example, frequency division multiplexing (FDM), time division multiplexing (TDM), code division multiplexing (CDM), spatial division multiplexing (SDM), and/or the like.

Multiple types of combination of predetermined parameters to be set in the NR cell can be predefined as parameter sets.

FIG. 6 is a diagram showing examples of parameter sets related to transmission signals in the NR cell. In the examples of FIG. 6, the parameter sets each include parameters related to transmission signals, that is, subframe spacing, the number of subcarriers per resource block in the NR cell, the number of symbols per subframe, and a CP-length type. The CP-length type is the type of CP length to be used in the NR cell. For example, CP-length type 1 corresponds to a normal CP in LTE, and CP-length type 2 corresponds to an extended CP in LTE.

The parameter sets related to transmission signals in the NR cell can be separately defined for the downlink and the uplink. Furthermore, the parameter sets related to transmission signals in the NR cell can be set independently for the downlink and the uplink.

Figure 7:
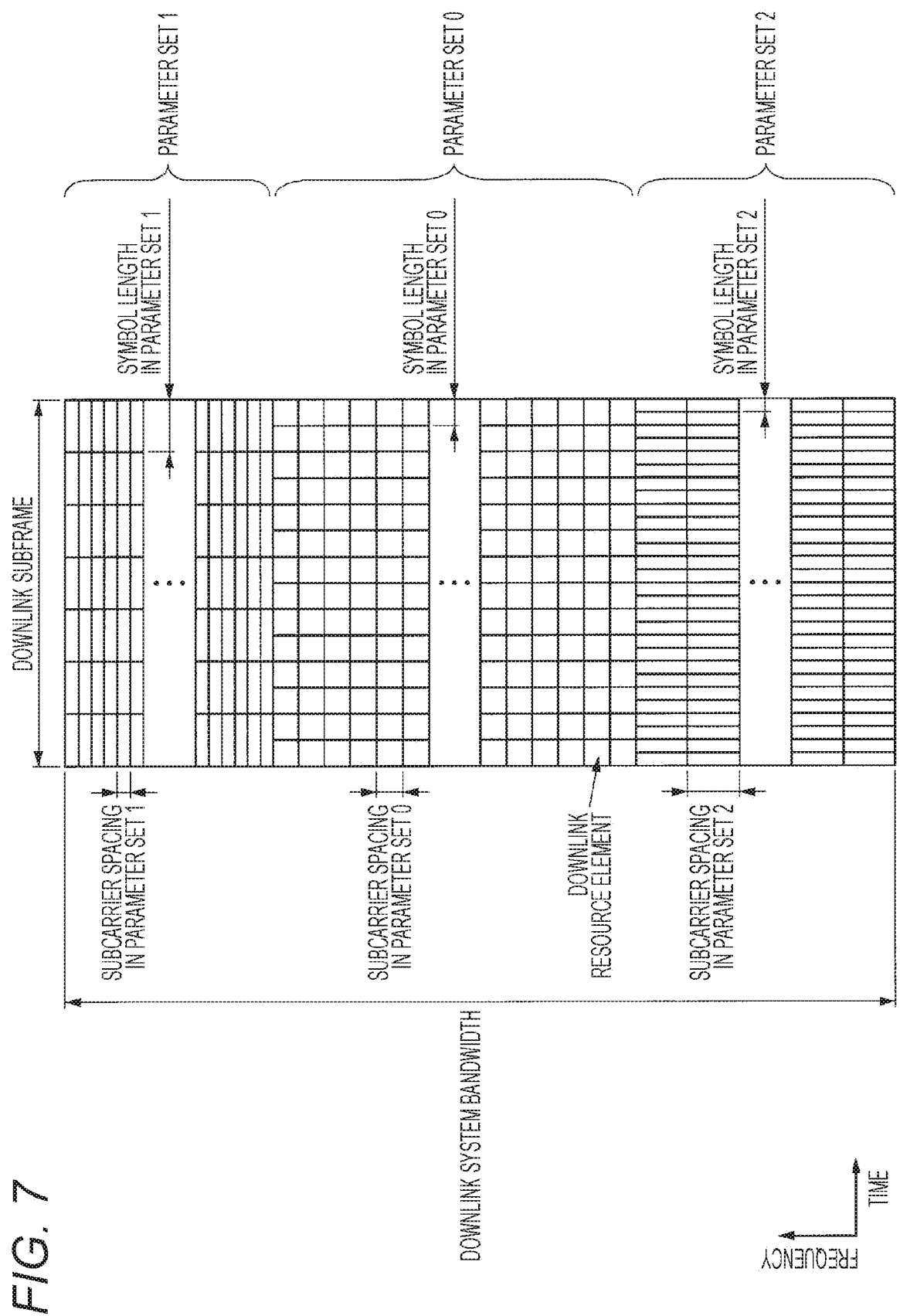
FIG. 7 is a diagram showing an example of a downlink subframe of NR in the same embodiment.

FIG. 7 is a diagram showing an example of a downlink subframe of NR in the present embodiment. In the example of FIG. 7, signals generated by use of parameter set 1, parameter set 0, and parameter set 2 are frequency-division multiplexed in a cell (system bandwidth). The diagram shown in FIG. 7 is also referred to as an NR downlink resource grid. The base station 100 can transmit an NR physical downlink channel and/or an NR physical downlink signal in a downlink subframe for downlink to the terminal apparatus 200. The terminal apparatus 200 can receive the NR physical downlink channel and/or the NR physical downlink signal in the downlink subframe for downlink from the base station 100.

Figure 8:
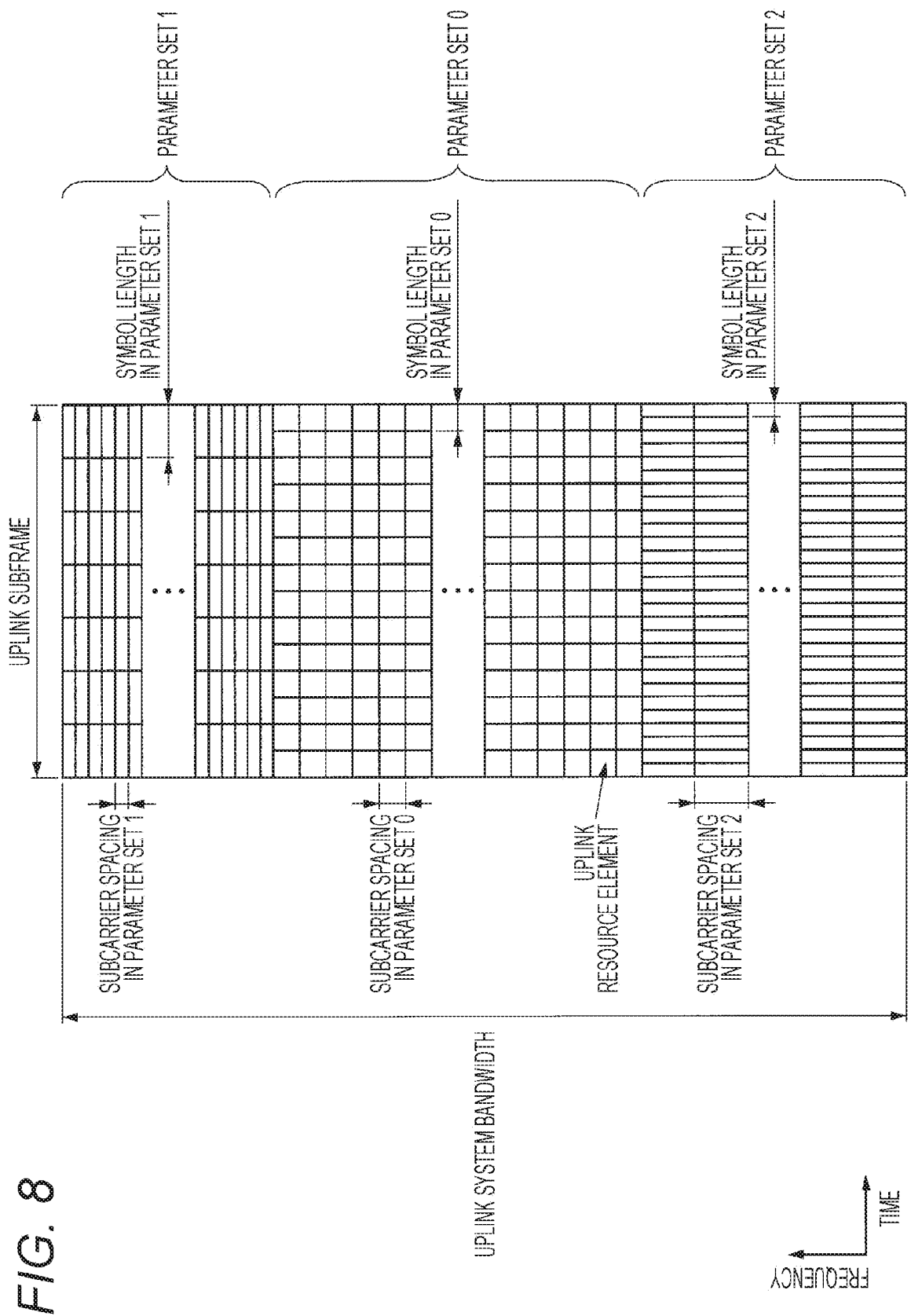
FIG. 8 is a diagram showing an example of an uplink subframe of NR in the same present embodiment.

FIG. 8 is a diagram showing an example of an uplink subframe of NR in the present embodiment. In the example of FIG. 8, the signals generated by use of parameter set 1, parameter set 0, and parameter set 2 are frequency-division multiplexed in a cell (system bandwidth). The diagram shown in FIG. 7 is also referred to as an NR uplink resource grid. The base station 100 can transmit an NR physical uplink channel and/or an NR physical uplink signal in an uplink subframe for uplink to the terminal apparatus 200. The terminal apparatus 200 can receive the NR physical uplink channel and/or the NR physical uplink signal in the uplink subframe for uplink from the base station 100.

<Signaling of Control Information in Present Embodiment>

The base station 100 and the terminal apparatus 200 can each use various methods for signaling (notification, information, and setting) of control information. Signaling of control information can be performed at various layers. Examples of signaling of control information include physical layer signaling, RRC signaling, MAC signaling, and the like. Physical layer signaling is signaling through a physical layer (layer). RRC signaling is signaling through an RRC layer. MAC signaling is signaling through a MAC layer. RRC signaling is dedicated RRC signaling for notifying the terminal apparatus 200 of unique control information, or common RRC signaling for notifying the base station 100 of unique control information. Signaling to be used by layers higher than a physical layer, such as RRC signaling or MAC signaling, is also referred to as higher-layer signaling.

RRC signaling is implemented by signaling RRC parameters. MAC signaling is implemented by signaling a MAC control element. Physical layer signaling is implemented by signaling downlink control information (DCI) or uplink control information (UCI). The RRC parameters and the MAC control element are transmitted by use of PDSCH or PUSCH. The DCI is transmitted by use of PDCCH or EPDCCH. The UCI is transmitted by use of PUCCH or PUSCH. RRC signaling and MAC signaling are used to signal semi-static control information and also referred to as semi-static signaling. Physical layer signaling is used to signal dynamic control information and also referred to as dynamic signaling. The DCI is used for PDSCH scheduling, PUSCH scheduling, or the like. The UCI is used for CSI reporting, HARQ-ACK reporting, a scheduling request (SR), and/or the like.

<Details of Multicarrier Transmission in Present Embodiment>

The terminal apparatus 200 is configured with a plurality of cells, and can perform multicarrier transmission. Communication to be performed by the terminal apparatus 200 by use of the plurality of cells is referred to as carrier aggregation (CA) or dual connectivity (DC). Details described in the present embodiment can be applied to each or some of the plurality of cells set for the terminal apparatus 200. The cells set for the terminal apparatus 200 are also referred to as serving cells.

In CA, the plurality of set serving cells includes a single primary cell (PCell) and one or more secondary cells (SCells). A single primary cell and one or more secondary cells can be set for the terminal apparatus 200 supporting CA.

The primary cell is a serving cell on which an initial connection establishment procedure has been performed, a serving cell on which a connection re-establishment procedure has been started, or a cell designated as a primary cell in a handover procedure. The primary cell operates at a primary frequency. The secondary cell can be set after the establishment or re-establishment of connection. The secondary cell operates at a secondary frequency. Note that the connection is also referred to as an RRC connection.

DC is an operation in which a predetermined terminal apparatus 200 consumes radio resources provided by at least two different network points. The network points are a master base station apparatus (Master eNB (MeNB)) and a secondary base station apparatus (Secondary eNB (SeNB)). Dual connectivity refers to establishment of RRC connections to at least two network points, to be performed by the terminal apparatus 200. In dual connectivity, the two network points may be connected by a non-ideal backhaul.

In DC, the base station 100 connected to at least an S1-mobility management entity (MME) and serving as a mobility anchor in a core network is referred to as a master base station apparatus. Furthermore, the base station 100 that is not the master base station apparatus and provides an additional radio resource to the terminal apparatus 200 is referred to as a secondary base station apparatus. A group of serving cells associated with the master base station apparatus is also referred to as a master cell group (MCG). A group of serving cells associated with the secondary base station apparatus is also referred to as a secondary cell group (SCG).

A primary cell belongs to the MCG in DC. Furthermore, in the SCG, a secondary cell corresponding to a primary cell is referred to as a primary secondary cell (PSCell). A function (capability and performance) equivalent to that of a PCell (a base station apparatus included in the PCell) may be supported in a PSCell (a base station apparatus included in the pSCell). Furthermore, only some of the functions of the PCell may be supported in the PSCell. For example, the function of performing PDCCH transmission by use of a search space different from CSS or USS may be supported in the PSCell. Furthermore, the PSCell may be constantly in a state of activation. Moreover, the PSCell is a cell which can receive PUCCH.

In DC, radio bearers (date radio bearers (DRBs) and/or signaling radio bearers (SRBs)) may be allocated separately to the MeNB and the SeNB. A duplex mode may be set separately for the MCG (PCell) and the SCG (PSCell). The MCG (PCell) and the SCG (PSCell) need not be synchronized with each other. A plurality of parameters for timing adjustment (timing advance group (TAG)) may be set independently for the MCG (PCell) and the SCG (PSCell). In dual connectivity, the terminal apparatus 200 transmits UCI corresponding to a cell in the MCG by using only the MeNB (PCell), and transmits UCI corresponding to a cell in the SCG by using only the SeNB (pSCell). A transmission method using PUCCH and/or PUSCH is applied to transmission of each UCI in each cell group.

PUCCH and PBCH (MIB) are transmitted only on the PCell or PSCell. Furthermore, PRACH is transmitted only on the PCell or PSCell unless a plurality of timing advance groups (TAGs) is set between cells in a CG.

Semi-persistent scheduling (SPS) and discontinuous transmission (DRX) may be performed in the PCell or PSCell. The same DRX as that performed in the PCell or PSCell of the same cell group may be performed in the secondary cell.

In the secondary cell, information/parameters related to MAC configuration are basically shared with the PCell or PSCell of the same cell group. Some of the parameters may be set for each secondary cell. Some timers and counters may be applied only to the PCell or PSCell.

In CA, a cell to which the TDD system is applied and a cell to which the FDD system is applied may be aggregated. In a case where the cell to which TDD is applied and the cell to which FDD is applied are aggregated, the present disclosure can be applied to either the cell to which TDD is applied or the cell to which FDD is applied.

The terminal apparatus 200 transmits, to the base station 100, information indicating combinations of bands for which CA is supported by the terminal apparatus 200. The terminal apparatus 200 transmits, to the base station 100, information indicating whether or not each of the combinations of bands supports simultaneous transmission and reception in the plurality of serving cells in a plurality of different bands.

<Self-Contained Transmission>

Figure 9:
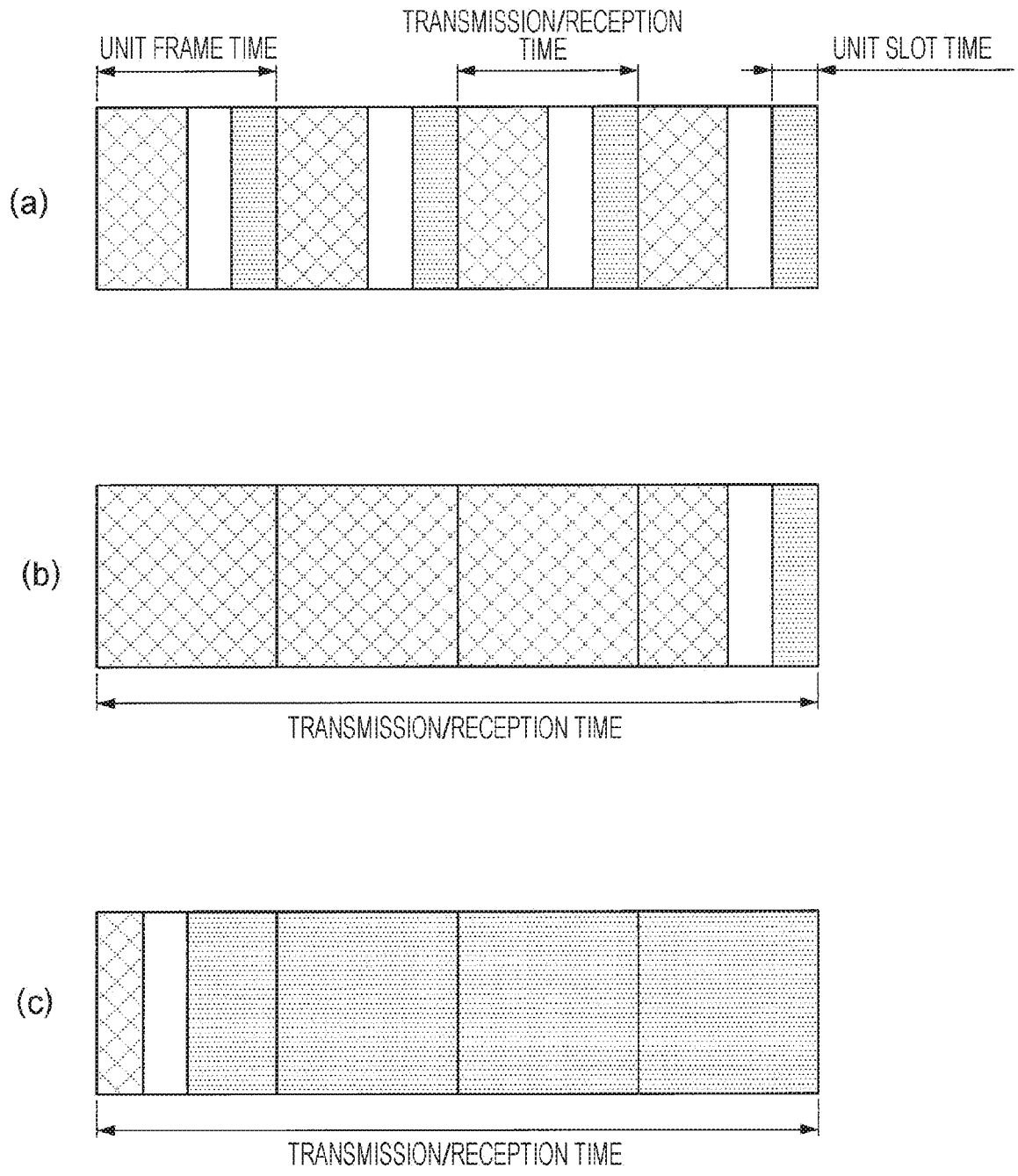
FIG. 9 is a diagram showing an example of a frame configuration of self-contained transmission in the same embodiment.

In NR, physical channels and/or physical signals can be transmitted by self-contained transmission. FIG. 9 is a diagram showing an example of a frame configuration of self-contained transmission in the present embodiment. In self-contained transmission, a single transmission/reception includes continuous downlink transmission, GP, and continuous downlink transmission in order from the top. The continuous downlink transmission includes at least a single piece of downlink control information and DMRS. The downlink control information provides an instruction to receive a downlink physical channel included in the continuous downlink transmission or an instruction to transmit an uplink physical channel included in the continuous uplink transmission. In a case where the instruction to receive the downlink physical channel has been provided by the downlink control information, a terminal apparatus 2 attempts to receive the downlink physical channel on the basis of the downlink control information. Then, the terminal apparatus 2 transmits a result as to whether or not the downlink physical channel has been successfully received (successfully decoded), through an uplink control channel included in the uplink transmission allocated after the GP. Meanwhile, in a case where the instruction to transmit the uplink physical channel has been provided by the downlink control information, the uplink physical channel to be transmitted on the basis of the downlink control information is included in uplink transmission, and then transmitted. As described above, it is possible to immediately cope with an increase or decrease in uplink and downlink traffic rates by flexibly switching between uplink data transmission and downlink data transmission according to the downlink control information. Furthermore, it is possible to achieve low-delay downlink communication by providing notification of success or failure in downlink reception through uplink transmission immediately following the downlink reception.

A unit slot time is the smallest time unit defining downlink transmission, GP, or uplink transmission. The unit slot time is reserved for any of downlink transmission, GP, and uplink transmission. The unit slot time does not include both downlink transmission and uplink transmission. The unit slot time may be the minimum transmission time for a channel associated with DMRS included in the unit slot time. One unit slot time is defined by, for example, an NR sampling interval ($T_s$) or an integral multiple of a symbol length.

A unit frame time may be the minimum time specified in scheduling. The unit frame time may be the smallest unit in which a transport block is transmitted. The unit slot time may be the maximum transmission time for the channel associated with the DMRS included in the unit slot time. The unit frame time may be a unit time for uplink transmission power to be determined in the terminal apparatus 2. The unit frame time may be referred to as a subframe. There are three types of unit frame time as follows: downlink transmission only, uplink transmission only, and a combination of uplink transmission and downlink transmission. One unit frame time is defined by, for example, the NR sampling interval ($T_s$), the symbol length, or an integral multiple of the unit slot time.

A transmission/reception time is a time required for a single transmission/reception. An interval between a single transmission/reception and another transmission/reception is occupied by a time (gap) in which none of physical channels and physical signals is transmitted. The terminal apparatus 2 should not average CSI measurements concerning different transmissions/receptions. The transmission/reception time may be referred to as TTI. One transmission/reception time is defined by, for example, the NR sampling interval ($T_s$), the symbol length, the unit slot time, or an integral multiple of the unit frame time.

<Channel Access Procedure for Unlicensed Channel>

A channel access procedure is performed to access an unlicensed channel (for example, an unlicensed band) when data transmission is performed at the base station 100 or the terminal apparatus 200.

Channel sensing is performed once or multiple times in the channel access procedure. Determination (vacancy determination) as to whether a channel to be sensed is idle (unoccupied, available, or enable) or busy (occupied, unavailable, or disable) is made on the basis of a result of the sensing. For example, the power of the channel in a predetermined latency is sensed in the channel sensing.

Examples of the latency in the channel access procedure include a first latency, a second latency, a third latency, and a fourth latency. The first latency corresponds to a slot time. Furthermore, the third latency corresponds to a deferment time.

A slot is the unit of latency of a base station apparatus and a terminal apparatus in the channel access procedure. The slot is defined as, for example, 9 microseconds. In other words, the first latency corresponds to 9 microseconds.

A single slot is inserted at the beginning of the second latency. In other words, the second latency corresponds to a slot to which a predetermined blank time has been added. The second latency is defined as, for example, 16 microseconds.

A defer period defined as the third latency includes the second latency and a plurality of consecutive slots following the second latency. The number of the plurality of consecutive slots following the second latency is determined on the basis of a priority class to be used to satisfy QoS.

The fourth latency includes the second latency and a single slot following the second latency.

The base station 100 or the terminal apparatus 200 senses a predetermined channel during a period of a predetermined slot. The predetermined slot is considered idle in a case where the base station 100 or the terminal apparatus 200 detects power smaller than a predetermined power detection threshold for at least 4 microseconds in the period of the predetermined slot. Meanwhile, in a case where the detected power is larger than the predetermined power detection threshold, the predetermined slot is considered busy.

The channel access procedures include a first channel access procedure and a second channel access procedure.

The first channel access procedure is performed by use of a plurality of slots and the defer period. Furthermore, the second channel access procedure is performed by use of the single fourth latency.

<Details of First Channel Access Procedure>

First, the first channel access procedure will be described. Steps set forth in (0) to (6) below are performed in the first channel access procedure.

(0) Channel sensing is performed in the defer period. In a case where the channel is idle in a slot within the defer period, the process proceeds to step (1).

Otherwise, the process proceeds to step (6).

(1) A counter initial value is acquired. Possible values of the counter initial value are integers between 0 and a contention window CW. Furthermore, the counter initial value is randomly determined in accordance with a uniform distribution. Then, the initial value of a counter N is set to the acquired counter initial value, and the process proceeds to step (2).

(2) In a case where a value of the counter N is larger than 0 and decrement of the counter N has been selected, the counter N is decremented by 1. Thereafter, the process proceeds to step (3).

(3) The process shifts to a standby state after a slot period is added. Furthermore, the channel is sensed in the additional slot. In a case where the additional slot is idle, the process proceeds to step (4). Otherwise, the process proceeds to step (5).

(4) In a case where the counter N indicates 0, this procedure is stopped. Otherwise, the process proceeds to step (2).

(5) The process shifts to a standby state after a defer period is added. Furthermore, the channel is sensed until it is detected that any one of slots included in the added defer period is busy, or until it is detected that all the slots included in the added defer period are idle. Thereafter, the process proceeds to step (6).

(6) In a case where it is sensed that the channel is idle in all the slots included in the added defer period, the process proceeds to step (4). Otherwise, the process proceeds to step (5).

Then, after step (4) is stopped in the above procedure, transmission including data is performed on the channel by use of PDSCH, PUSCH, or the like.

Note that transmission need not be performed on the channel after step (4) is stopped in the above procedure. In this case, it is possible to then perform transmission without performing the above procedure, in a case where the channel is idle in all of the slots and the defer periods immediately before transmission. Meanwhile, in a case where the channel is not idle in any of the slots and the defer periods, the process proceeds to step (1) of the above procedure after it is sensed that the channel is idle in all the slots in the added defer period.

<Details of Second Channel Access Procedure>

Next, the second channel access procedure will be described. In the second channel access procedure, transmission may be performed immediately after the channel is considered idle as a result of sensing in at least the fourth latency. Meanwhile, in a case where the channel is not considered idle as a result of the sensing in at least the fourth latency, no transmission is performed.

<Contention Window Adaptive Procedure>

Next, a contention window adaptive procedure will be described. A contention window CW to be used in the first channel access procedure is determined on the basis of the contention window adaptive procedure.

The value of the contention window CW is held for each priority class. Furthermore, the contention window CW takes a value between a minimum contention window and a maximum contention window. The minimum contention window and the maximum contention window are determined on the basis of the priority class.

Adjustment of the value of the contention window CW is performed prior to step (1) in the first channel access procedure. The value of the contention window CW is increased in a case where the rate of NACKs is higher than a threshold in at least a HARQ response corresponding to a reference subframe in the contention window adaptive procedure or a shared channel in a reference HARQ process. Otherwise, the value of the contention window CW is set to the minimum contention window.

The value of the contention window CW is increased on the basis of, for example, the following equation: $CW=2 \cdot (CW+1)-1$.

<Details of Channel Access Procedure in Downlink>

Next, a channel access procedure in downlink will be described. In a case of performing downlink transmission including PDSCH, PDCCH, and/or EPDCCH in an unlicensed channel, a base station accesses the channel to perform the downlink transmission on the basis of the first channel access procedure.

Meanwhile, in a case of performing downlink transmission not including PDSCH but including DRS in an unlicensed channel, the base station accesses the channel to perform the downlink transmission on the basis of the second channel access procedure. Note that it is preferable that the duration of the downlink transmission be smaller than 1 millisecond.

<Details of Channel Access Procedure in Uplink>

Next, a channel access procedure in uplink will be described. In a case where there is an instruction to perform the first channel access procedure in an uplink grant for scheduling PUSCH in an unlicensed channel, a terminal apparatus performs the first channel access procedure prior to uplink transmission including the PUSCH.

Furthermore, in a case where there is an instruction to perform the second channel access procedure in the uplink grant for scheduling PUSCH, the terminal apparatus performs the second channel access procedure prior to uplink transmission including the PUSCH.

In addition, the terminal apparatus performs the second channel access procedure for uplink transmission not including PUSCH but including SRS, prior to the uplink transmission.

Furthermore, in a case where the end of uplink transmission specified in the uplink grant is within uplink duration (UL duration), the terminal apparatus performs the second channel access procedure prior to the uplink transmission, regardless of the type of procedure specified in the uplink grant.

Moreover, in a case where uplink transmission is performed after the fourth latency following the completion of downlink transmission from the base station, the terminal apparatus performs the second channel access procedure prior to the uplink transmission.

<Grant-Free Based Transmission>

Grant-free based transmission refers to transmission to be performed by the terminal apparatus 200 by use of resources divided by an appropriate frequency axis and time axis, without receiving a resource allocation (grant) from the base station 100. Power saving of the terminal apparatus 200 and low-delay communication due to a reduction in signaling overhead can be cited as the main purposes of the grant-free based transmission. In the conventional grant based transmission, the base station 100 notifies the terminal apparatus 200 of a resource to be used in downlink/uplink. As a result, it is possible to perform communication without causing resource contention with another terminal apparatus 200. Meanwhile, the conventional grant based transmission involves signaling overhead due to this notification.

Figure 10:
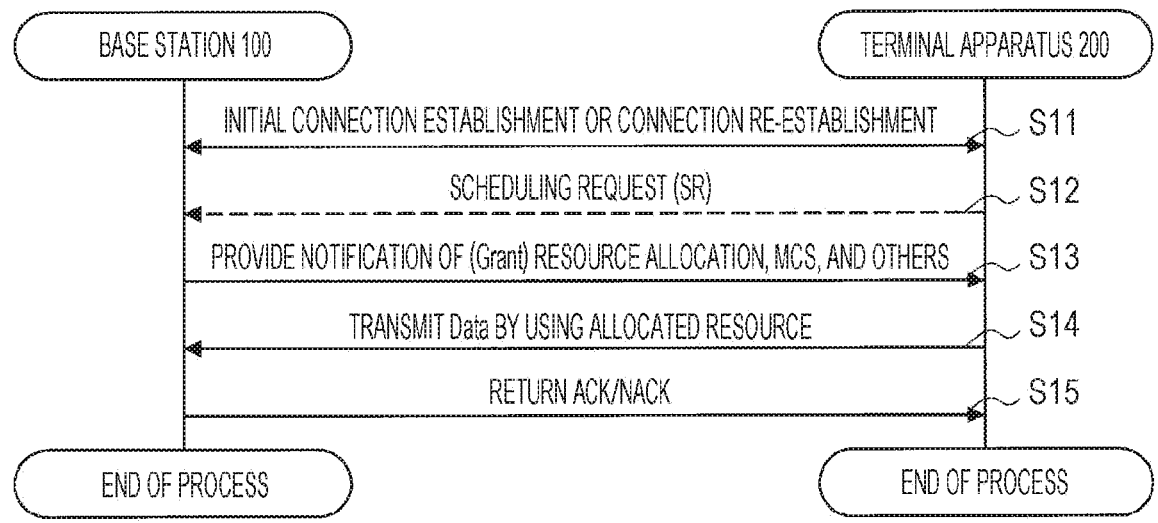
FIG. 10 is a flowchart showing an example of grant based transmission.

FIG. 10 is a flowchart showing an example of grant based transmission. For example, in a case of grant based transmission as shown in FIG. 10, when initial connection establishment or connection re-establishment is performed between the base station 100 and the terminal apparatus 200 (step S11), the terminal apparatus 200 transmits a scheduling request (SR) to the base station 100 (step S12). The base station 100 provides notification of (grants) resource allocation, MCS, and the like to the terminal apparatus 200 (step 13). The terminal apparatus 200 transmits data to the base station 100 by using an allocated resource (step 14). The base station 100 returns ACK or NACK to the terminal apparatus 200 (step 15).

The terminal apparatus 200 transmits data by using the resource allocated by the base station 100, the MCS, and the like. This generates signaling overhead corresponding to step S13 (and also signaling overhead corresponding to step S12 in some cases). Such signaling overhead is reduced in grant-free based transmission.

Figure 11:
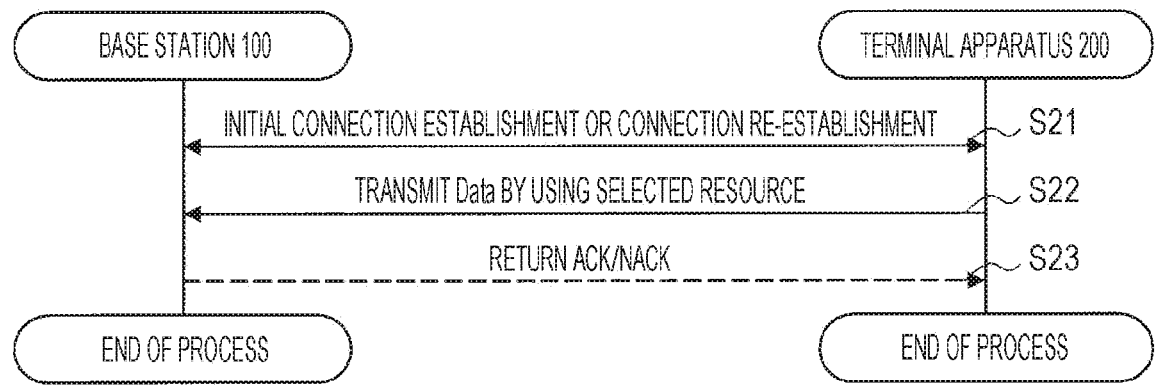
FIG. 11 is a flowchart showing an example of grant-free based transmission.

FIG. 11 is a flowchart showing an example of grant-free based transmission. For example, in a case of grant-free based transmission as shown in FIG. 11, when initial connection establishment or connection re-establishment is performed between the base station 100 and the terminal apparatus 200 (step S21), the terminal apparatus 200 transmits data to the base station 100 by using an arbitrarily selected resource (step 22). The base station 100 returns ACK or NACK to the terminal apparatus 200 (step 23).

Grant-free based transmission as shown in FIG. 11 implements communication without the processes of steps S12 and S13 in FIG. 10. Therefore, grant-free based transmission, which does not involve notification of resource allocation, is considered a major candidate technology in terms of power saving and low-delay communication required for next-generation communications. The terminal apparatus 200 may select a transmission resource in grant-free based transmission from among all available bands or from a predetermined resource pool. The resource pool may be statically determined as a specification. Furthermore, the resource pool may be specified when a connection between the base station 100 and the terminal apparatus 200 is established. In addition, the resource pool may be semi-statically or dynamically set by System Information, DCI, or the like.

<Practical Examples of Multichannel Sensing Transmission and Reception>

Next, the following describes a practical example of data transmission and reception based on multichannel sensing according to the embodiment of the present disclosure. Note that, hereinafter, data transmission based on multichannel sensing is also referred to as "multichannel sensing transmission", and data reception based on multichannel sensing is also referred to as "multichannel sensing reception".

Multichannel sensing transmission is a method that implements data transmission as follows. Channel sensing is performed for each of different channels (including, for example, frequency resources, frequency bands, cells, beams, and the like). Then, data transmission is attempted by use of a channel that has become available earlier.

As an example, it is assumed that unlicensed bands of 2.4 GHz and 5 GHz are available. For example, assume that a plurality of channels, such as a 2.4 GHz band and a 5 GHz band, is available to a wireless communication apparatus. The conventional method allows the wireless communication apparatus to perform communication by using only one of the plurality of channels, or perform transmission/reception of different data in the respective bands. Therefore, in a case where a result of channel sensing of the unlicensed band of, for example, 2.4 GHz shows that the unlicensed band of 2.4 GHz remains occupied, it is necessary, in the conventional method, to suspend transmission of data to be transmitted in the 2.4 GHz band. As a result, there are cases where transmission delay may occur in the conventional method.

Thus, in the system according to the embodiment of the present disclosure, channel sensing is simultaneously performed by use of, for example, the unlicensed band of 5 GHz in addition to the unlicensed band of 2.4 GHz, and transmission of the same data is attempted. In other words, it is possible to reduce a delay in starting transmission by performing channel sensing in both the 2.4 GHz band and the 5 GHz band, and attempting to transmit the same data on a channel that has become available earlier. This can be applied to all wireless communication links including the uplink, the downlink, and the sidelink.

Furthermore, assume that after data are transmitted on the channel that has become available earlier, the other channel becomes available. In such a case, the same or different data may be transmitted on the other channel. In addition, in a case where a plurality of channels has become available at the same time, the same or different data may be transmitted simultaneously by use of the plurality of channels. Note that in a case where the same data are transmitted on different channels, it is possible to expect improvement in error rate characteristics by applying selection diversity or combined diversity at the point of reception. Alternatively, in a case where different data are transmitted, the same data for which transmission has been attempted on the channel are discarded, and different data are to be transmitted. Furthermore, although the practical example intended for two channels has been described above, the present technology may also be applied to a case of three or more channels.

Figure 12:
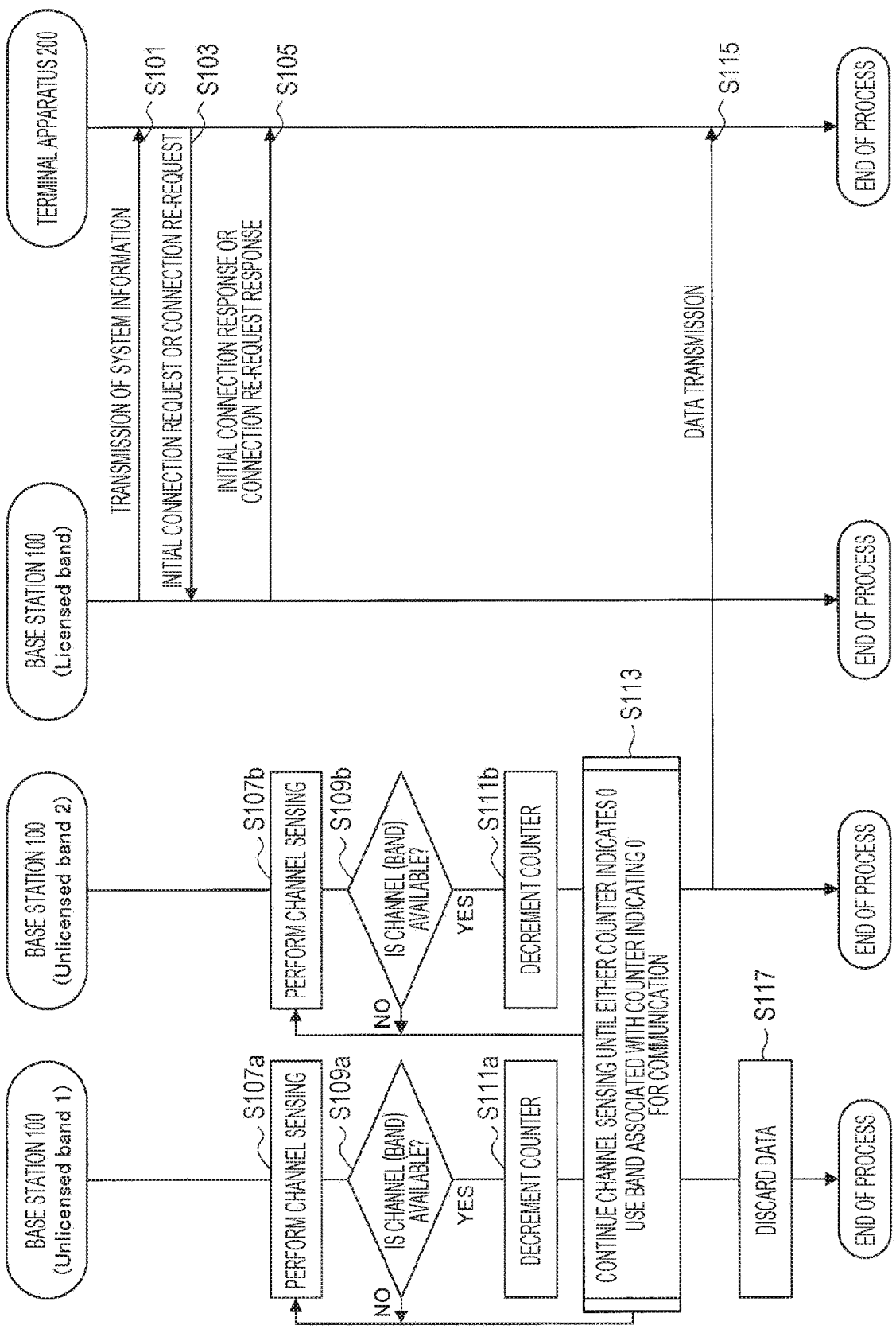
FIG. 12 is a diagram showing an example of the flow of a series of processes in the system according to the same embodiment.

Here, an example of a procedure in a case of data transmission based on channel sensing for a plurality of unlicensed bands will be described with reference to FIG. 12. FIG. 12 is a diagram showing an example of the flow of a series of processes in the system 1 according to the present embodiment. Note that the example shown in FIG. 12 illustrates a case where channel sensing is performed in the base station 100 for a plurality of unlicensed bands. Furthermore, the example shown in FIG. 12 illustrates a case where data are transmitted by use of a channel that has become available first and no data are transmitted on the other channel. Note that, as processes for controlling communication in the base station 100, the example shown in FIG. 12 individually illustrates processes of controlling communications using respective channels of a licensed band, an unlicensed band 1, and an unlicensed band 2.

Note that the licensed band corresponds to a band to be used in communication in which data are transmitted/received via a resource allocated by the base station 100 to the terminal apparatus 200. In other words, some channels are occupied by the terminal apparatuses 200 to which these channels (in other words, resources) have been allocated in the licensed band. Meanwhile, in the unlicensed band, each channel (in other words, a resource) is shared among a plurality of the terminal apparatuses 200 in a range in which no contention occurs (in other words, each channel is shared under control for avoiding contention). Note that the licensed band corresponds to an example of a "second channel", and the unlicensed band corresponds to an example of a "first channel".

First, system information is transmitted from the base station 100 (notification unit 157) to the terminal apparatus 200 in the cell by use of the licensed band (S101). Note that, at this time, the base station 100 may notify the terminal apparatus 200 of control information regarding data transmission using the unlicensed band. As a result, the terminal apparatus 200 (information acquisition unit 243) can acquire, as the control information, various information for receiving data transmitted from the base station 100 by use of the unlicensed band.

Next, the terminal apparatus 200 (notification unit 247) transmits an initial connection request to the base station 100 on the basis of the acquired system information (S103). Furthermore, as a response to the initial connection request, an initial connection response is transmitted from the base station 100 (notification unit 157) to the terminal apparatus 200 (S105). Thus, a connection is established between the base station 100 and the terminal apparatus 200.

Furthermore, in a case where the connection with the base station 100 is disconnected, the terminal apparatus 200 (notification unit 247) may transmit a connection re-request to the base station 100 (S103). In this case, after a connection re-request response is transmitted from the base station 100 (notification unit 157) to the terminal apparatus 200 (S105), a connection between the base station 100 and the terminal apparatus 200 is established again.

Note that the above-described procedure including a series of steps denoted by reference signs S101 to S105 is executed through, for example, the licensed band.

Next, the following describes an example of a process to be performed in a case where the base station 100 transmits data by using either the unlicensed band 1 or the unlicensed band 2. For example, the base station 100 (determination unit 155) individually performs channel sensing for the respective channels of the unlicensed band 1 and the unlicensed band 2 (S107a and S107b), and determines whether or not the channels are available for data transmission (S109a and S109b). Then, the base station 100 individually controls counters associated with the respective channels of the unlicensed band 1 and the unlicensed band 2 on the basis of determination results for the channels (S111a and S111b).

Specifically, in a case where the base station 100 determines that the unlicensed band 1 is available as a result of channel sensing for the unlicensed band 1 (S109a, YES), the base station 100 decrements the counter associated with the unlicensed band 1 (S111a). Furthermore, in a case where the base station 100 determines that the unlicensed band 1 is not available (S109a, NO), the base station 100 continues channel sensing until it is determined that the unlicensed band 1 is available (S107a).

Similarly, in a case where the base station 100 determines that the unlicensed band 2 is available as a result of channel sensing for the unlicensed band 2 (S109b, YES), the base station 100 decrements the counter associated with the unlicensed band 2 (S111b). Furthermore, in a case where the base station 100 determines that the unlicensed band 2 is not available (S109b, NO), the base station 100 continues channel sensing until it is determined that the unlicensed band 2 is available (S107b).

The base station 100 continues the above-described processes denoted by reference signs S107a to S111a and S107b to S111b until at least either of the counters associated with the unlicensed band 1 and the unlicensed band 2 indicates a value below a threshold (for example, until at least either of the counters indicates 0). Then, the base station 100 uses, for data transmission to the terminal apparatus 200, the channel associated with the counter indicating a value equal to or below the threshold (S113).

For instance, the example shown in FIG. 12 illustrates a case where the value of the counter associated with the unlicensed band 2 has become equal to or below the threshold (in other words, has become 0) earlier than the value of the counter associated with the unlicensed band 1. In this case, the base station 100 (communication control unit 151) transmits data to the terminal apparatus 200 by using the unlicensed band 2 (S115). Furthermore, in this case, the base station 100 may discard data to be transmitted in the unlicensed band 1 (S117).

An example of the procedure in the case of data transmission based on channel sensing for a plurality of unlicensed bands has been described above with reference to FIG. 12.

Furthermore, multichannel sensing transmission can also be applied to grant-free transmission. As described above, grant-free transmission is a method in which the terminal apparatus 200 arbitrarily selects a resource from a resource pool specified by the base station 100, and uses the selected resource for data transmission. Therefore, there is a possibility that resource contention between the terminal apparatus 200 and another terminal apparatus 200 may occur. Thus, it is conceivable that channel sensing is used as a means for avoiding or mitigating resource contention.

For instance, as shown in the above-described example of the case of using the unlicensed band, it is conceivable that channel sensing is performed for channels (for example, frequency resources or frequency bands) available for grant-free transmission, and grant-free transmission is performed when it becomes possible to perform transmission. The above-described multichannel sensing transmission is considered effective also in this case.

Furthermore, as another example, in a case where there is a plurality of transmission channels available to the terminal apparatus 200 for grant-free transmission in carrier aggregation (CA), dual connectivity, or the like, the terminal apparatus 200 attempts to transmit data by using the plurality of channels. Here, the terminal apparatus 200 performs channel sensing, and attempts to perform grant-free transmission of data on a channel that has become available earlier. This makes it possible to reduce a delay in starting transmission.

These can be applied to all the wireless communication links including the uplink and the sidelink.

Furthermore, assume that after data are transmitted on the channel that has become available earlier, the other channel becomes available. In such a case, data may be transmitted on the other channel. Note that in a case where the same data are transmitted on different channels, it is possible to expect improvement in error rate characteristics by applying selection diversity or combined diversity at the point of reception. Furthermore, although the practical example intended for two channels has been described above, the present technology may also be applied to a case of three or more channels.

Figure 13:
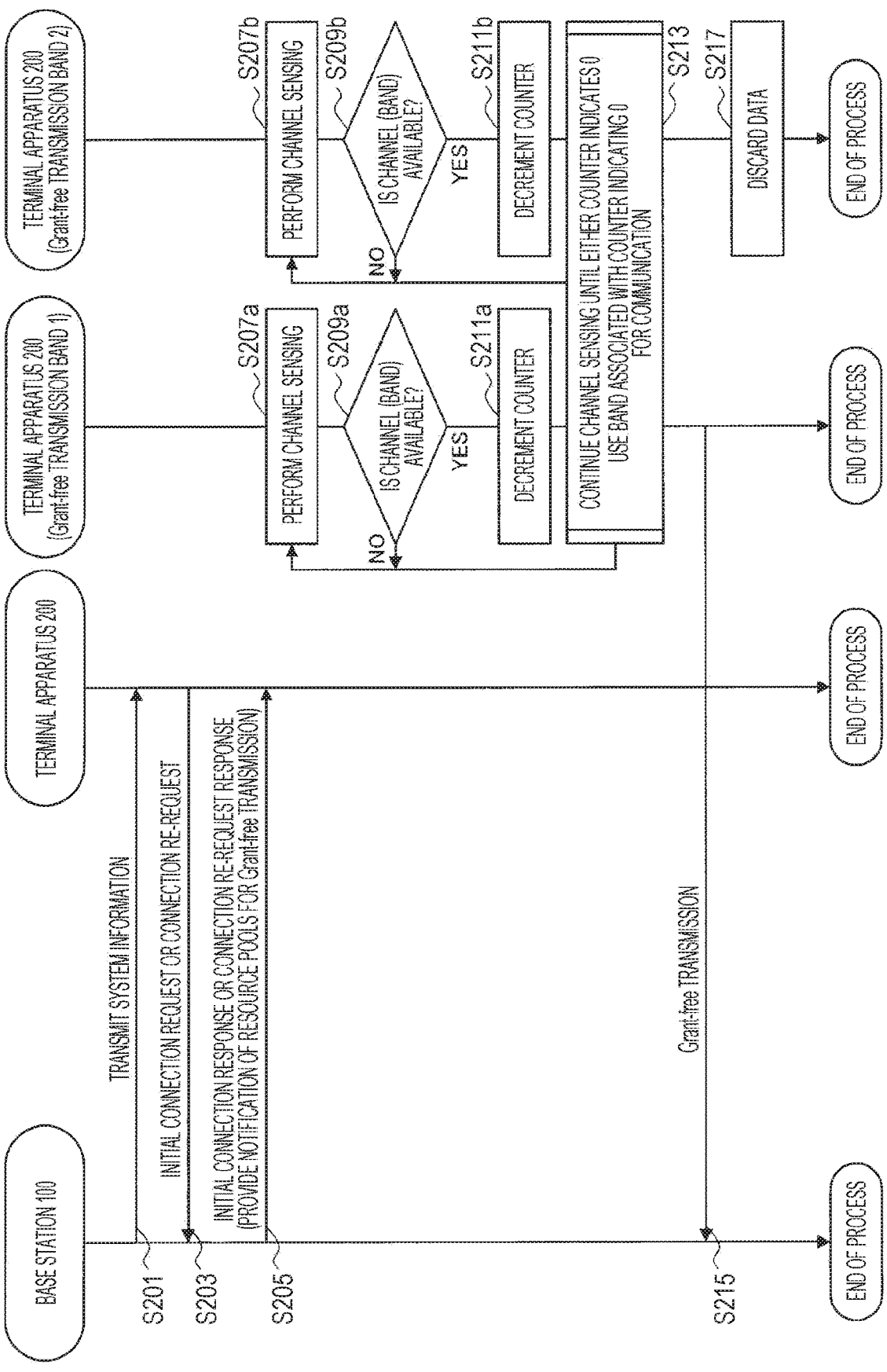
FIG. 13 is a diagram showing another example of the flow of the series of processes in the system according to the same embodiment.

Here, an example of a procedure in a case of performing grant-free transmission of data on the basis of channel sensing for a plurality of bands will be described with reference to FIG. 13. FIG. 13 is a diagram showing another example of the flow of the series of processes in the system 1 according to the present embodiment. Note that the example shown in FIG. 13 illustrates a case where channel sensing is performed in the terminal apparatus 200 for a plurality of bands available for grant-free transmission. Furthermore, the example shown in FIG. 13 illustrates a case where data are transmitted by use of a channel that has become available first and no data are transmitted on the other channels. Note that, as processes for controlling communication in the terminal apparatus 200, the example shown in FIG. 13 individually illustrates a process of establishing a connection with the base station 100 and respective processes of transmitting data via the plurality of bands available for grant-free transmission. Furthermore, portions related to connection establishment in the processes denoted by reference signs S201 to S205 in FIG. 13 are substantially similar to those in the processes denoted by reference signs S101 to S105 in FIG. 12. Therefore, detailed description thereof will be omitted. In addition, the base station 100 may notify the terminal apparatus 200 of a resource pool for grant-free transmission in the process denoted by reference sign S205. Note that, hereinafter, a band available for grant-free transmission is also referred to as a "grant-free transmission band". Furthermore, in the example shown in FIG. 13, the grant-free transmission band corresponds to an example of the "second channel".

For example, the terminal apparatus 200 (determination unit 245) individually performs channel sensing for respective channels of a grant-free transmission band 1 and a grant-free transmission band 2 (S207a and S207b), and determines whether or not the channels are available for data transmission (S209a and S209b). Then, the terminal apparatus 200 individually controls counters associated with the respective channels of the grant-free transmission band 1 and the grant-free transmission band 2 on the basis of determination results for the channels (S211a and S211b).

Specifically, in a case where the terminal apparatus 200 determines that the grant-free transmission band 1 is available as a result of channel sensing for the grant-free transmission band 1 (S209a, YES), the terminal apparatus 200 decrements the counter associated with the grant-free transmission band 1 (S211a). Furthermore, in a case where the terminal apparatus 200 determines that the grant-free transmission band 1 is not available (S209a, NO), the terminal apparatus 200 continues channel sensing until it is determined that the grant-free transmission band 1 is available (S207a).

Similarly, in a case where the terminal apparatus 200 determines that the grant-free transmission band 2 is available as a result of channel sensing for the grant-free transmission band 2 (S209b, YES), the terminal apparatus 200 decrements the counter associated with the grant-free transmission band 2 (S211b). Furthermore, in a case where the terminal apparatus 200 determines that the grant-free transmission band 2 is not available (S209b, NO), the terminal apparatus 200 continues channel sensing until it is determined that the grant-free transmission band 2 is available (S207b).

The terminal apparatus 200 continues the above-described processes denoted by reference signs S107a to S111a and S107b to S111b until at least either of the counters associated with the grant-free transmission band 1 and the grant-free transmission band 2 indicates a value below a threshold (for example, until at least either of the counters indicates 0). Then, the terminal apparatus 200 uses, for grant-free transmission of data to the base station 100, the channel associated with the counter indicating a value equal to or below the threshold (S213).

For instance, the example shown in FIG. 13 illustrates a case where the value of the counter associated with the grant-free transmission band 1 has become equal to or below the threshold (in other words, has become 0) earlier than the value of the counter associated with the grant-free transmission band 2. In this case, the terminal apparatus 200 (communication control unit 241) transmits data to the base station 100 by using the grant-free transmission band 1 (S215). Furthermore, in this case, the terminal apparatus 200 may discard data to be transmitted in the grant-free transmission band 2 (S217).

An example of the procedure in the case of performing grant-free transmission of data on the basis of channel sensing for a plurality of bands has been described above with reference to FIG. 13.

Figure 14:
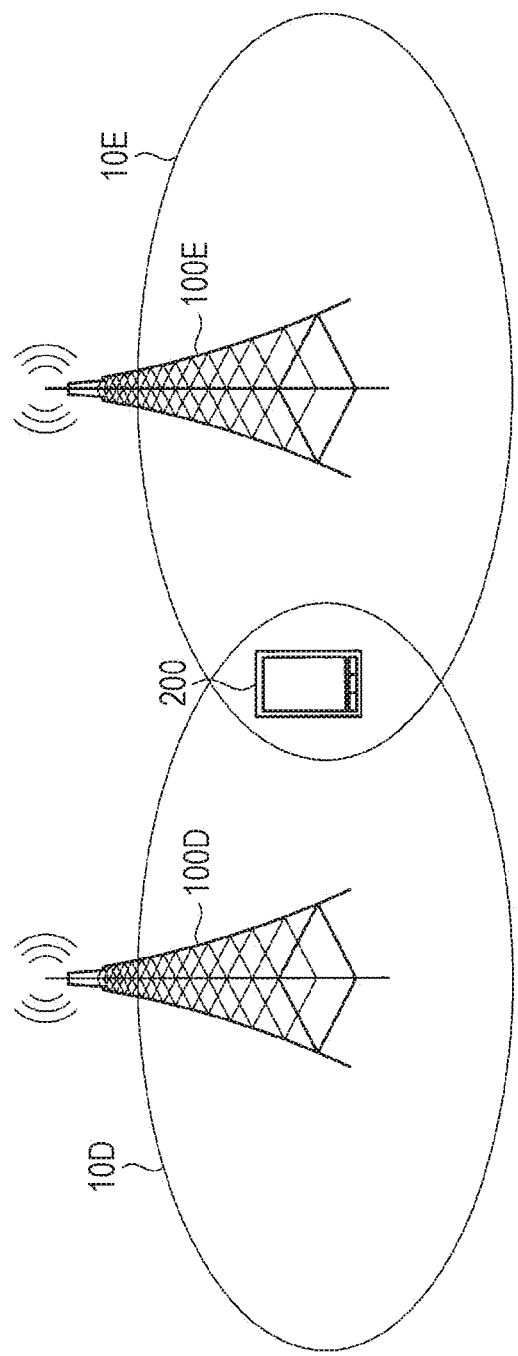
FIG. 14 is a diagram showing an example of assuming dual connectivity between two base stations and a single terminal apparatus.

Note that the above-described example of data transmission using unlicensed bands and example of grant-free transmission illustrate cases where channels are bands. However, the technology according to the present disclosure can similarly be applied to, for example, a case where cells or beams are different even in the same band. For instance, FIG. 14 shows an example of assuming dual connectivity between two base stations 100D and 100E and the single terminal apparatus 200. Specifically, the example shown in FIG. 14 assumes as follows: a cell 10D includes the base station 100D, a cell 10E includes the base station 100E, and the same band or different bands are used in the cells 10D and 10E. In this case, a channel between the base station 100D and the terminal apparatus 200 and a channel between the base station 100E and the terminal apparatus 200 can be regarded as spatially separate channels. Therefore, even if, for example, the cell 10D and the cell 10E use the same band, there are cases where results of channel sensing may be different. In other words, channel sensing is performed for each of the channel between the base station 100D and the terminal apparatus 200 and the channel between the base station 100E and the terminal apparatus 200 both in downlink and uplink. Then, transmission is attempted on a channel that has become available earlier. As a result, it is possible to achieve communication with lower delay.

Figure 15:
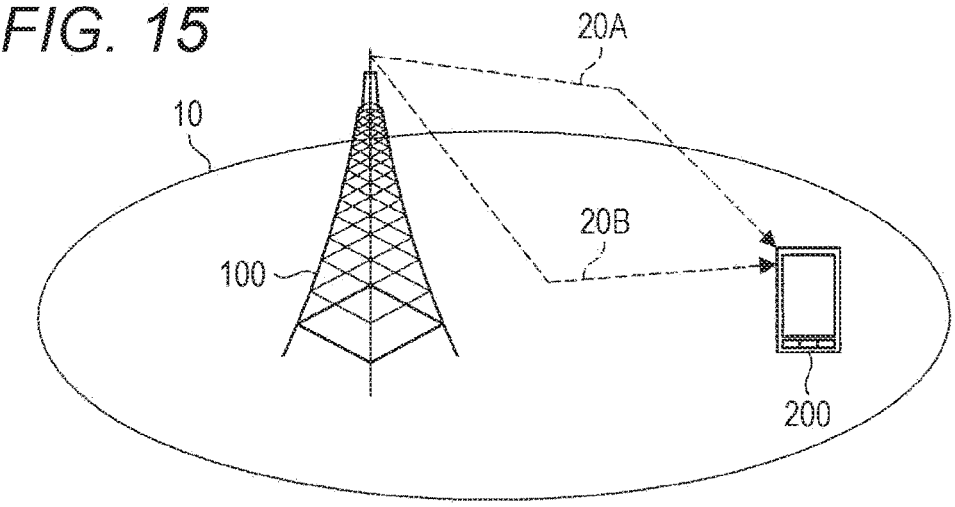
FIG. 15 is a diagram showing an example of a case where data are transmitted by use of a plurality of beams.

Furthermore, FIG. 15 shows an example of a case where data are transmitted by use of a plurality of beams. Specifically, FIG. 15 shows an example of a case where the base station 100 and the terminal apparatus 200 communicate by using a plurality of beams (for example, beams 20A and 20B). Here, it is assumed that the beams 20A and 20B use the same band. The beams 20A and 20B can be regarded as spatially separate channels also in this case. Therefore, there are cases where respective results of channel sensing for the beams 20A and 20B may be different. Thus, channel sensing is performed for each of the plurality of beams, and transmission is attempted on a channel that has become available earlier. As a result, it is possible to achieve communication with lower delay.

Furthermore, the present practical example can also be applied to sidelink communication such as so-called Device to Device (D2D) communication, communication via a relay (hereinafter also referred to as "relay communication"), and the like. Specifically, in a case where a plurality of channels is available both in D2D communication and relay communication, channel sensing is performed for the plurality of channels. As a result, it is possible to reduce delay as in the other practical examples described above.

Figure 16:
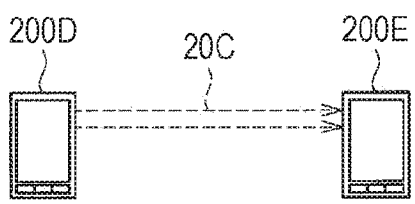
FIG. 16 is a diagram showing an example of a case of assuming D2D communication between two terminal apparatuses.

For example, FIG. 16 shows an example of a case of assuming D2D communication between two terminal apparatuses 200. In FIG. 16, reference sign 20C denotes a schematic communication path in D2D communication between a terminal apparatus 200D and a terminal apparatus 200E. In other words, the terminal apparatus 200D and the terminal apparatus 200E implement D2D communication via a plurality of channels in the example shown in FIG. 16. In this case, for example, channel sensing is performed for each of the plurality of channels, and transmission is attempted on a channel that has become available earlier. As a result, it is possible to achieve communication with lower delay.

Figure 17:
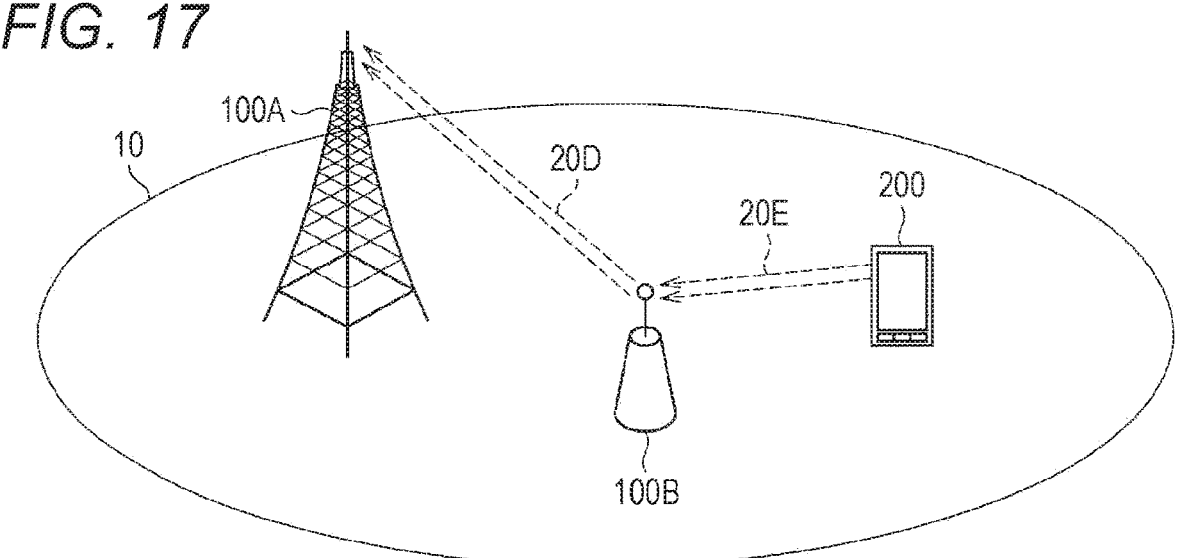
FIG. 17 is a diagram showing an example of a case where data are transmitted via a relay.

Furthermore, FIG. 17 shows an example of a case where data are transmitted via a relay. The example corresponds to an example of a case where a relay node 100B mediates communication between the base station 100A and the terminal apparatus 200. In FIG. 17, reference sign 20D denotes a schematic communication path between the base station 100A and the relay node 100B. Furthermore, reference sign 20E denotes a schematic communication path between the relay node 100B and the terminal apparatus 200. In other words, communication is performed via a plurality of channels on each of the communication paths 20D and 20E in the example shown in FIG. 17. In this case, for example, channel sensing is performed for each of the plurality of channels, and transmission is attempted on a channel that has become available earlier, on each of the communication paths 20D and 20E. As a result, it is possible to achieve communication with lower delay.

Figure 18:
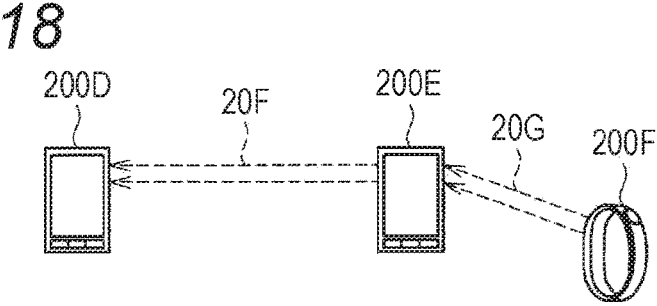
FIG. 18 is a diagram showing an example of a case where D2D communication and relay communication are combined.

Furthermore, FIG. 18 shows an example of a case where D2D communication and relay communication are combined. In FIG. 18, reference sign 20F denotes a schematic communication path between the terminal apparatus 200D and the terminal apparatus 200E operating as a relay node (hereinafter also referred to as "relay terminal 200E"). Furthermore, reference sign 20G denotes a schematic communication path between the relay terminal 200E and a slave terminal apparatus 200F. In other words, communication is performed via a plurality of channels on each of the communication paths 20F and 20G in the example shown in FIG. 17. In this case, for example, channel sensing is performed for each of the plurality of channels, and transmission is attempted on a channel that has become available earlier, on each of the communication paths 20F and 20G. As a result, it is possible to achieve communication with lower delay.

Note that it is considered that signaling for multichannel sensing transmission is required in the above practical examples. Signaling information may be provided in notification in either the licensed band or the unlicensed band. Described below is an example of signaling required for multichannel sensing transmission or reception. Examples of signaling information include control information set forth in (1) to (6) below.

(1) Capability of indicating whether or not multichannel sensing transmission or reception can be performed (2) Information regarding channels for multichannel sensing transmission or reception (3) Instruction to perform multichannel sensing transmission or reception (4) Channel sensing counter value (5) Uplink resources (6) Resource selection priority Note that the following describes details of each piece of the above-described signaling information.

(1) Capability of Indicating Whether or not Multichannel Sensing Transmission or Reception can be Performed In a case where multichannel sensing transmission or reception is performed, it is necessary for the base station 100 and the terminal apparatus 200 to mutually recognize whether or not the base station 100 or the terminal apparatus 200 supports multichannel sensing transmission or reception. For example, the base station 100 notifies the terminal apparatus 200 whether or not the base station 100 supports multichannel sensing transmission or reception, on the basis of system information block (SIB), RRC signaling, or the like. Accordingly, the terminal apparatus 200 can recognize that the base station 100 supports multichannel sensing transmission or reception, by receiving the above-described control information.

Furthermore, the terminal apparatus 200 can notify the base station 100 that the terminal apparatus 200 supports multichannel sensing transmission or reception, on the basis of, for example, RRC signaling or the like. At this time, whether or not multichannel sensing transmission or reception can be supported may be provided in notification in association with, for example, a UE category. For example, multichannel sensing transmission or reception may be added as one of capabilities in the UE category. Alternatively, there may exist a separate UE category supporting multichannel sensing transmission or reception.

(2) Information Regarding Channels for Multichannel Sensing Transmission

For example, in a case of assuming downlink, the base station 100 performs channel sensing for two or more channels, and attempts to perform multichannel sensing transmission on a channel that has become available first. At this time, in order to receive a signal transmitted from the base station 100, the terminal apparatus 200 needs information regarding channels possibly to be used by the base station 100 for multichannel sensing transmission.

As a specific example, in a case where it is assumed that the base station 100 can attempt multichannel sensing transmission both in the 2.4 GHz band and the 5 GHz band, it is necessary for the terminal apparatus 200 to know that there is a possibility that the base station 100 may perform multichannel sensing transmission in the 2.4 GHz band and the 5 GHz band. Therefore, the base station 100 notifies the terminal apparatus 200 of information indicating that the 2.4 GHz band and the 5 GHz band may be used for multichannel sensing transmission.

Note that the means for notification is not particularly limited. As a specific example, notification may be provided semi-statically on the basis of RRC signaling, SIB, or the like, or may be provided dynamically on the basis of DCI or the like. Furthermore, as another example, the means for notification may be determined in advance as a static specification.

Examples of control information to be provided in notification include a numerical value directly indicating a frequency band, index information corresponding to a band, enable information for multichannel sensing transmission, and the like. The numerical value directly indicating a frequency band corresponds to control information indicating the numerical value of the frequency band simply as a numerical value. Furthermore, the index information corresponding to a band corresponds to control information that defines, for example, the 2.4 GHz band as a 0th bit and the 5 GHz band as a first bit in such a way as to enable switching between ON and OFF by specifying 0 or 1 in the bit. In addition, the enable information for multichannel sensing transmission is control information that defines, for example, whether multichannel sensing transmission is performed by use of all bands possibly to be used (multichannel sensing transmission is enabled) or transmission is performed in any one of the bands possibly to be used (multichannel sensing transmission is disabled) in a case where the bands possibly to be used are determined in advance statically or semi-statically. These pieces of control information can be similarly applied to uplink, sidelink, and the like. With these pieces of control information, for example, the base station 100 statically, semi-statically, or dynamically specifies a band that may be used for multichannel sensing transmission, and causes the terminal apparatus 200 to recognize the specified band. As a result, the terminal apparatus 200 can perform multichannel sensing transmission by using the specified band.

(3) Instruction to Perform Multichannel Sensing Transmission or Reception

In a case where the base station 100 and the terminal apparatus 200 support multichannel sensing transmission or reception, multichannel sensing transmission or reception can be performed. However, the system may be configured such that whether or not to perform multichannel sensing transmission or reception can be selectively switched even if the capability supports multichannel sensing transmission or reception. For example, it is conceivable that the base station 100 semi-statically notifies the terminal apparatus 200 that the terminal apparatus 200 may perform multichannel sensing transmission or reception, on the basis of SIB or RRC signaling. Furthermore, the base station 100 may dynamically provide the above-described notification to the terminal apparatus 200 on the basis of DCI or the like.

In a case where the base station 100 permits the terminal apparatus 200 to perform multichannel sensing transmission in the uplink or sidelink, on the basis of these pieces of control information, the terminal apparatus 200 may perform multichannel sensing transmission.

Furthermore, as another example, in a case where the base station 100 notifies the terminal apparatus 200 of the possibility that multichannel sensing transmission may be performed in the downlink, the terminal apparatus 200 may constantly watch a plurality of bands.

Assume that data are transmitted by use of a band that has become available first in multichannel sensing transmission. At this time, whether or not the same data are transmitted by use of the remaining bands after transmission of the data is important information in multichannel sensing transmission. For example, in a case where the same data are not transmitted and are discarded, a process of diversity reception is not necessary. Note that information as to whether to transmit or discard the same data may be statically determined in advance in specifications or the like, or may be provided in notification by semi-static or dynamic signaling.

(4) Channel Sensing Counter Value

In a case where channel sensing is performed, for example, a counter is used as described above, and it becomes possible to transmit data when the value of the counter has become equal to or below a threshold (for example, when the value of the counter has become 0). Therefore, it is necessary to set a counter initial value (in other words, information regarding a transmission waiting period). Possible cases of performing channel sensing in a plurality of bands include cases set forth in (A) and (B) below.

(A) A single counter initial value is provided in notification, and the same initial value is used in all bands.

(B) A counter initial value is provided in notification separately for each band.

In the case of (A), the base station 100 notifies the terminal apparatus 200 of a single counter initial value. The terminal apparatus 200 applies the counter initial value provided in notification to all bands to be used in multichannel sensing transmission. Meanwhile, in the case of (B), a counter initial value is provided in notification separately for each band to be used in multichannel sensing transmission.

(5) Uplink Resources

In a case of assuming uplink in grant-base transmission, the base station 100 notifies the terminal apparatus 200 of a transmission resource, and the terminal apparatus 200 performs uplink transmission by using the transmission resource provided in notification after channel sensing. At this time, the base station 100 may notify the terminal apparatus 200 of a single transmission resource common to a plurality of bands or different transmission resources (here, a transmission resource refers to logical arrangement). Note that in a case of applying a transmission resource common to a plurality of bands, it is possible to reduce signaling. Meanwhile, in a case of applying different transmission resources, it is possible to change the number of resource blocks (RBs) depending on the band. Therefore, it is possible to increase the number of RBs in a case of, for example, performing wider band transmission in a high-frequency band. Moreover, it is possible to change a modulation and coding scheme to a more highly reliable one and reduce a code rate and modulation order by increasing the number of RBs.

(6) Resource Selection Priority

In a case where multichannel sensing transmission is performed, it is conceivable that priority information regarding a band or resource to be used is required as the case may be. For example, as described above, it is regarded, as an effective method, to perform transmission by using a band or resource associated with a counter that has indicated a value equal to or below a threshold (for example, a value equal to 0) earlier.

Meanwhile, it is also conceivable that counters for a plurality of bands or a plurality of resources may simultaneously indicate values equal to or below the threshold (for example, indicate 0). At this time, in a case where no priority has been set among the plurality of bands or the plurality of resources, it is conceivable that the following operation is performed: transmission is simultaneously performed by use of the plurality of bands or the plurality of resources, and combined diversity or selection diversity is performed at a receiving side.

Furthermore, as another example, in a case where priority has been set among the plurality of bands or the plurality of resources, it is conceivable that the following operation is performed: data are transmitted by use of only a band or resource having high priority, and the data are discarded without being transmitted in the other bands or resources. In this case, it is possible to maintain a state in which a counter indicates a value equal to or below a threshold (for example, a state in which the counter continues to indicate 0) by discarding data without transmitting the data. Therefore, it is possible to, for example, immediately use the relevant bands or resources for the next transmission.

Moreover, even if the next transmission data exist, the next transmission data can be intentionally held as they are without being transmitted. In this case, in a case where, for example, an ACK of data previously transmitted in another band has not been received, or in a case where a NACK has been received, it is also possible to immediately perform retransmission by using a band kept in the state in which the counter indicates a value equal to or below the threshold (for example, the state in which the counter continues to indicate 0). Furthermore, as another example, even if the next transmission data does not exist, it is also possible to maintain the state in which the counter indicates a value equal to or below the threshold (for example, the state in which the counter continues to indicate 0) until the next transmission data are generated, and to perform transmission immediately after the next transmission data are generated.

Furthermore, practical examples based on two axes, that is, the frequency axis and the time axis have been cited in the above description. Meanwhile, the technology according to the present disclosure can also be applied to a practical example based on three or more axes, in which an axis of another factor is taken into consideration in addition to the frequency axis and the time axis. A case of considering non-orthogonal multiple access (NOMA) in addition to frequency and time can be cited as a specific example. Note that examples of non-orthogonal axes include an interleave pattern axis, a spreading pattern axis, a scrambling pattern axis, a codebook axis, a power axis, and the like. The index or pattern of these non-orthogonal axes may also be referred to as a multiple access (MA) signature.

Furthermore, the element referred to as a "resource" in each of the above-described practical examples may also be referred to as, for example, an "MA resource" or "MA physical resource".

3. Application Examples

The technology according to the present disclosure can be applied to various products. For example, the base station 100 may be implemented as any type of evolved Node B (eNB) such as a macro eNB or small eNB. The small eNB may be an eNB covering a cell smaller than a macrocell, such as a pico eNB, micro eNB, or home (femto) eNB. Instead, the base station 100 may be implemented as another type of base station such as a Node B or base transceiver station (BTS). The base station 100 may include a main body (also referred to as a base station apparatus) and one or more remote radio heads (RRHs). The main body controls wireless communication. The one or more RRHs are located separately from the main body. Furthermore, various types of terminals to be described later may operate as the base stations 100 by performing base station functions on a temporary or semipermanent basis. Moreover, at least some of the constituent elements of the base station 100 may be implemented in a base station apparatus or a module for the base station apparatus.

Furthermore, the terminal apparatus 200 may be implemented as, for example, a mobile terminal or on-board terminal. Examples of the mobile terminal include a smartphone, a tablet personal computer (PC), a notebook PC, a portable game terminal, a portable/dongle type mobile router, a digital camera, and the like. Examples of the on-board terminal include a car navigation apparatus and the like. In addition, the terminal apparatus 200 may be implemented as a terminal (also referred to as a machine type communication (MTC) terminal) that performs machine to machine (M2M) communication. Furthermore, the terminal apparatus 200 may be implemented as a so-called low cost UE such as an MTC terminal, eMTC terminal, or NB-IoT terminal. Moreover, at least some of the constituent elements of the terminal apparatus 200 may be implemented in a module (for example, an integrated circuit module including a single die) to be mounted on these terminals.

3.1. Application Examples Related to Base Station

First Application Example

Figure 19:
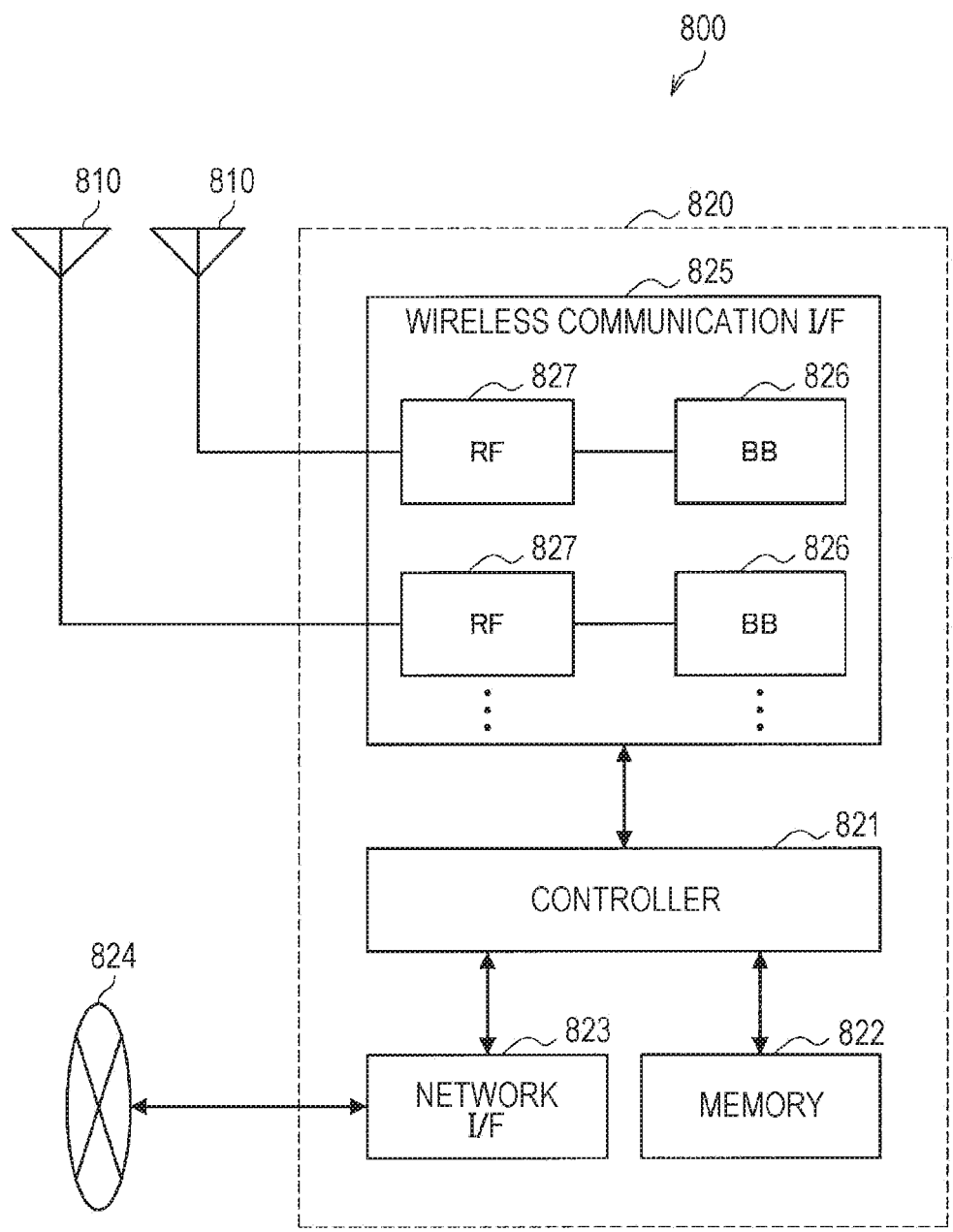
FIG. 19 is a block diagram showing a first example of a schematic configuration of an eNB.

FIG. 19 is a block diagram showing a first example of a schematic configuration of an eNB to which the technology according to the present disclosure can be applied. An eNB 800 includes one or more antennas 810 and a base station apparatus 820. Each antenna 810 and the base station apparatus 820 can be connected to each other via an RF cable.

Each of the antennas 810 includes a single or a plurality of antenna elements (for example, a plurality of antenna elements forming a MIMO antenna), and is used by the base station apparatus 820 for transmitting and receiving wireless signals. The eNB 800 may include a plurality of the antennas 810 as shown in FIG. 19. The plurality of antennas 810 may correspond to, for example, a plurality of frequency bands to be used by the eNB 800. Note that although FIG. 19 shows an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or DSP. The controller 821 causes various upper-layer functions of the base station apparatus 820 to be performed. For example, the controller 821 generates a data packet from data in a signal processed by the wireless communication interface 825, and transfers the generated packet via the network interface 823. The controller 821 may generate a bundled packet by bundling data from a plurality of baseband processors, and transfer the bundled packet that has been generated. Furthermore, the controller 821 may have a logical function of performing control such as radio resource control, radio bearer control, mobility management, admission control, or scheduling. Furthermore, the control may be performed in cooperation with neighboring eNBs or core network nodes. The memory 822 includes a RAM and a ROM, and stores a program to be executed by the controller 821 and various control data (for example, a terminal list, transmission power data, scheduling data, and the like).

The network interface 823 is a communication interface for connecting the base station apparatus 820 to a core network 824. The controller 821 may communicate with a core network node or another eNB via the network interface 823. In that case, the eNB 800 and the core network node or another eNB may be connected to each other via a logical interface (for example, an S1 interface or X2 interface). The network interface 823 may be a wired communication interface or a wireless communication interface for a wireless backhaul. In a case where the network interface 823 is a wireless communication interface, the network interface 823 may use, for wireless communication, a frequency band higher than a frequency band to be used by the wireless communication interface 825.

The wireless communication interface 825 supports any cellular communication system such as Long Term Evolution (LTE) or LTE-Advanced, and provides a wireless connection to a terminal located in a cell of the eNB 800 via the antenna 810. The wireless communication interface 825 may typically include a baseband (BB) processor 826, an RF circuit 827, and the like. The BB processor 826 may perform, for example, coding/decoding, modulation/demodulation, multiplexing/demultiplexing, and the like. The BB processor 826 processes various signals in each layer (for example, L1, medium access control (MAC), radio link control (RLC), and Packet Data Convergence Protocol (PDCP)). In place of the controller 821, the BB processor 826 may have some or all of the logical functions described above. The BB processor 826 may be a module including a memory that stores a communication control program, a processor that executes the program, and a related circuit. The BB processor 826 may be configured such that it is possible to change the function of the BB processor 826 by updating the above-described program. Furthermore, the above-described module may be a card or blade to be inserted into a slot of the base station apparatus 820, or may be a chip to be mounted on the above-described card or blade. Meanwhile, the RF circuit 827 may include a mixer, a filter, an amplifier, and the like. The RF circuit 827 transmits and receives wireless signals via the antenna 810.

The wireless communication interface 825 may include a plurality of the BB processors 826 as shown in FIG. 19. The plurality of BB processors 826 may correspond to, for example, the plurality of frequency bands to be used by the eNB 800. Furthermore, the wireless communication interface 825 may include a plurality of the RF circuits 827 as shown in FIG. 19. The plurality of RF circuits 827 may correspond to, for example, a plurality of antenna elements. Note that although FIG. 19 shows an example in which the wireless communication interface 825 includes the plurality of BB processors 826 and the plurality of RF circuits 827, the wireless communication interface 825 may include the single BB processor 826 or the single RF circuit 827.

One or more constituent elements (at least any one of the communication control unit 151, the information acquisition unit 153, the determination unit 155, or the notification unit 157) included in the processing unit 150 described with reference to FIG. 2 may be implemented in the wireless communication interface 825 in the eNB 800 shown in FIG. 19. Alternatively, at least some of these constituent elements may be implemented in the controller 821. As an example, the eNB 800 may be equipped with a module including a part (for example, the BB processor 826) or all of the wireless communication interface 825 and/or the controller 821, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 800 and executed by the wireless communication interface 825 (for example, the BB processor 826) and/or the controller 821. As described above, the eNB 800, the base station apparatus 820, or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, the wireless communication unit 120 described with reference to FIG. 2 may be implemented in the wireless communication interface 825 (for example, the RF circuit 827) in the eNB 800 shown in FIG. 19. In addition, the antenna unit 110 may be implemented on the antenna 810. Moreover, the network communication unit 130 may be implemented in the controller 821 and/or the network interface 823. Furthermore, the storage unit 140 may be implemented in the memory 822.

Second Application Example

Figure 20:
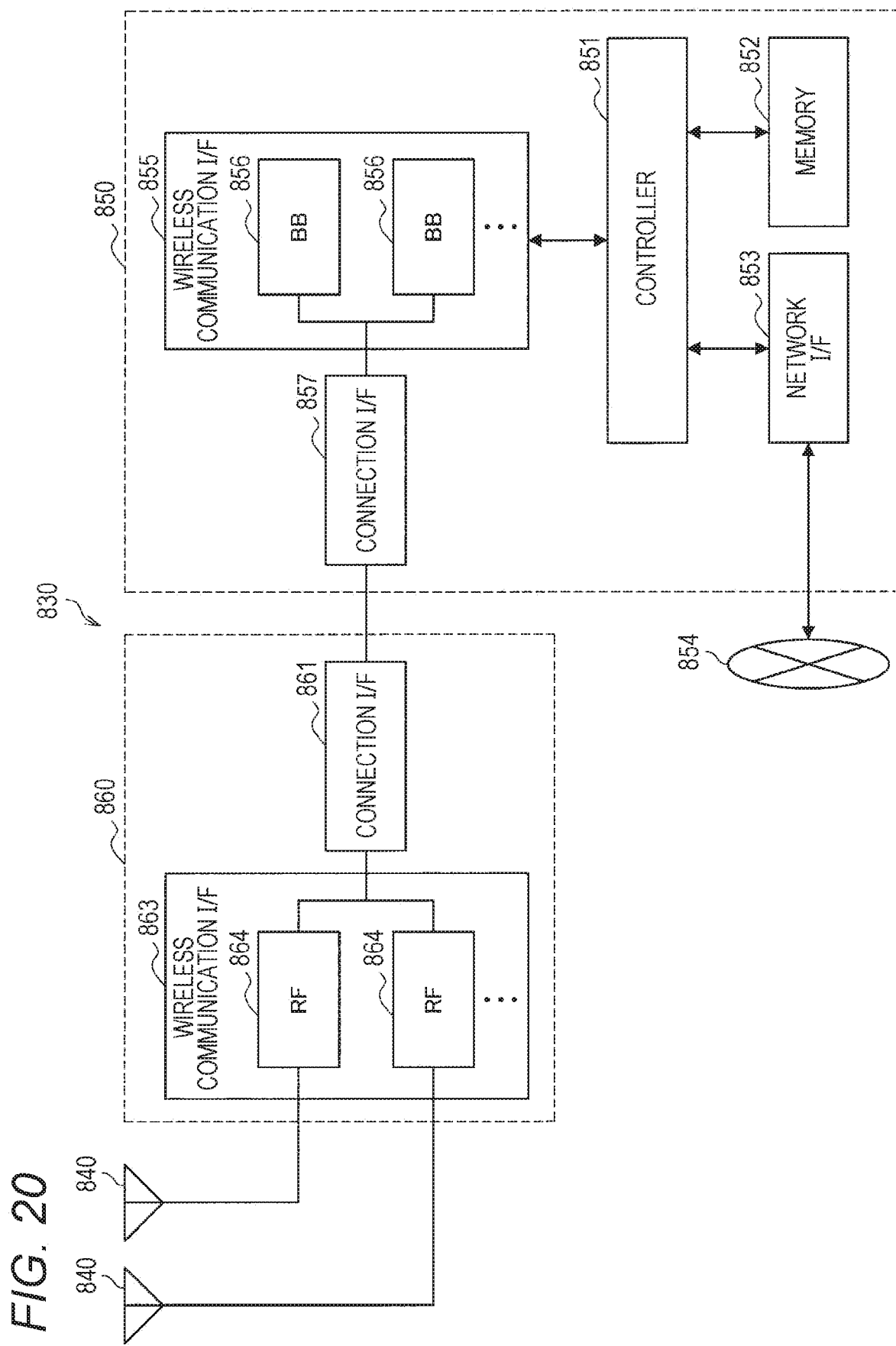
FIG. 20 is a block diagram showing a second example of the schematic configuration of the eNB.

FIG. 20 is a block diagram showing a second example of the schematic configuration of the eNB to which the technology according to the present disclosure can be applied. An eNB 830 includes one or more antennas 840, a base station apparatus 850, and an RRH 860. Each antenna 840 and the RRH 860 can be connected to each other via an RF cable. Furthermore, the base station apparatus 850 and the RRH 860 can be connected to each other via a high-speed line such as an optical fiber cable.

Each of the antennas 840 includes a single or a plurality of antenna elements (for example, a plurality of antenna elements forming a MIMO antenna), and is used by the RRH 860 for transmitting and receiving wireless signals. The eNB 830 may include a plurality of the antennas 840 as shown in FIG. 20. The plurality of antennas 840 may correspond to, for example, a plurality of frequency bands to be used by the eNB 830. Note that although FIG. 20 shows an example in which the eNB 830 includes the plurality of antennas 840, the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 19.

The wireless communication interface 855 supports any cellular communication system such as LTE or LTE-Advanced, and provides a wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 19 except that the BB processor 856 is connected to an RF circuit 864 of the RRH 860 via the connection interface 857. The wireless communication interface 855 may include a plurality of the BB processors 856 as shown in FIG. 19. The plurality of BB processors 856 may correspond to, for example, the plurality of frequency bands to be used by the eNB 830. Note that although FIG. 20 shows an example in which the wireless communication interface 855 includes the plurality of BB processors 856, the wireless communication interface 855 may include the single BB processor 856.

The connection interface 857 is an interface for connecting the base station apparatus 850 (wireless communication interface 855) to the RRH 860. The connection interface 857 may be a communication module for communication on the above-described high-speed line that connects the base station apparatus 850 (wireless communication interface 855) and the RRH 860.

Furthermore, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the above-described high-speed line.

The wireless communication interface 863 transmits and receives wireless signals via the antenna 840. The wireless communication interface 863 may typically include the RF circuit 864 and the like. The RF circuit 864 may include a mixer, a filter, an amplifier, and the like. The RF circuit 864 transmits and receives wireless signals via the antenna 840. The wireless communication interface 863 may include a plurality of the RF circuits 864 as shown in FIG. 20. The plurality of RF circuits 864 may correspond to, for example, a plurality of antenna elements. Note that although FIG. 20 shows an example in which the wireless communication interface 863 includes the plurality of RF circuits 864, the wireless communication interface 863 may include the single RF circuit 864.

One or more constituent elements (at least any one of the communication control unit 151, the information acquisition unit 153, the determination unit 155, or the notification unit 157) included in the processing unit 150 described with reference to FIG. 2 may be implemented in the wireless communication interface 855 and/or the wireless communication interface 863 in the eNB 830 shown in FIG. 20. Alternatively, at least some of these constituent elements may be implemented in the controller 851. As an example, the eNB 830 may be equipped with a module including a part (for example, the BB processor 856) or all of the wireless communication interface 855 and/or the controller 851, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 830 and executed by the wireless communication interface 855 (for example, the BB processor 856) and/or the controller 851. As described above, the eNB 830, the base station apparatus 850, or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 120 described with reference to FIG. 2 may be implemented in the wireless communication interface 863 (for example, the RF circuit 864) in the eNB 830 shown in FIG. 20. In addition, the antenna unit 110 may be implemented on the antenna 840. Moreover, the network communication unit 130 may be implemented in the controller 851 and/or the network interface 853. Furthermore, the storage unit 140 may be implemented in the memory 852.

3.2. Application Examples Related to Terminal Apparatus

First Application Example

Figure 21:
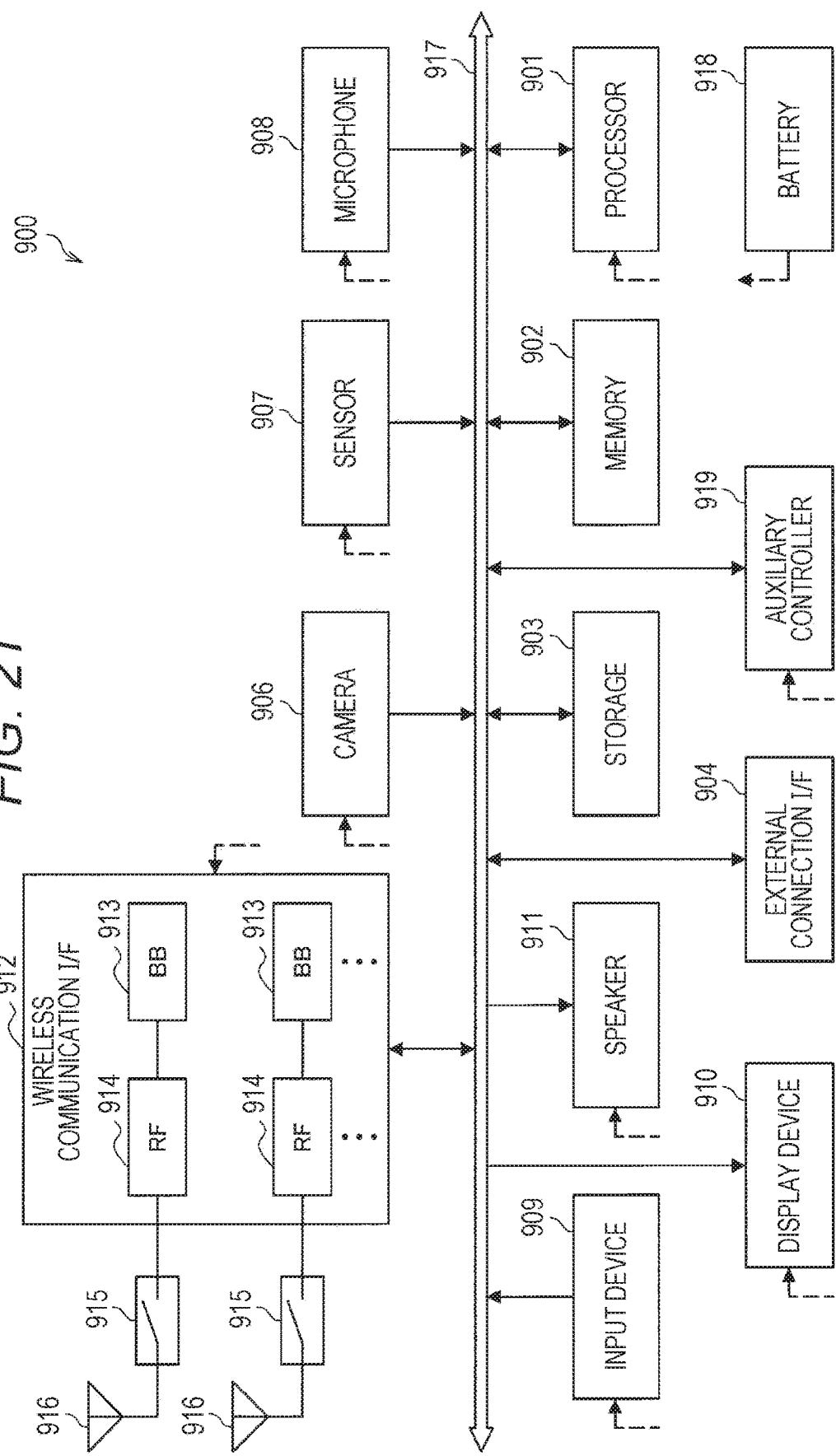
FIG. 21 is a block diagram showing an example of a schematic configuration of a smartphone.

FIG. 21 is a block diagram showing an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC). The processor 901 controls functions of an application layer and other layers of the smartphone 900. The memory 902 includes a RAM and a ROM, and stores data and a program to be executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 includes, for example, an imaging element such as a charge coupled device (CCD) or a complementary metal oxide semiconductor (CMOS), and generates a captured image. The sensor 907 may include, for example, a group of sensors such as a positioning sensor, a gyro sensor, a geomagnetic sensor, and an acceleration sensor. The microphone 908 converts voice input to the smartphone 900 into a voice signal. The input device 909 includes, for example, a touch sensor for detecting a touch on a screen of the display device 910, a keypad, a keyboard, a button or switch, and the like. The input device 909 accepts an operation or information input from a user. The display device 910 includes a screen such as a liquid crystal display (LCD) or an organic light emitting diode (OLED) display, and displays an output image for the smartphone 900. The speaker 911 converts a voice signal to be output from the smartphone 900 into voice.

The wireless communication interface 912 supports any cellular communication system such as LTE or LTE-Advanced, and performs wireless communication. The wireless communication interface 912 may typically include a BB processor 913, an RF circuit 914, and the like. The BB processor 913 may perform, for example, coding/decoding, modulation/demodulation, multiplexing/demultiplexing, and the like. The BB processor 913 performs various signal processing for wireless communication. Meanwhile, the RF circuit 914 may include a mixer, a filter, an amplifier, and the like. The RF circuit 914 transmits and receives wireless signals via the antenna 916. The wireless communication interface 912 may be a one-chip module in which the BB processor 913 and the RF circuit 914 are integrated. The wireless communication interface 912 may include a plurality of the BB processors 913 and a plurality of the RF circuits 914 as shown in FIG. 21. Note that although FIG. 21 shows an example in which the wireless communication interface 912 includes the plurality of BB processors 913 and the plurality of RF circuits 914, the wireless communication interface 912 may include the single BB processor 913 or the single RF circuit 914.

Moreover, in addition to the cellular communication system, the wireless communication interface 912 may support another type of wireless communication system such as a near field communication system, a proximity wireless communication system, or a wireless local area network (LAN) system. In that case, the wireless communication interface 912 may include the BB processor 913 and the RF circuit 914 for each wireless communication system.

Each of the antenna switches 915 causes a connection destination of the antenna 916 to switch between a plurality of circuits (for example, circuits for different wireless communication systems) included in the wireless communication interface 912.

Each of the antennas 916 includes a single or a plurality of antenna elements (for example, a plurality of antenna elements forming a MIMO antenna), and is used by the wireless communication interface 912 for transmitting and receiving wireless signals. The smartphone 900 may include a plurality of the antennas 916 as shown in FIG. 21. Note that although FIG. 21 shows an example in which the smartphone 900 includes the plurality of antennas 916, the smartphone 900 may include the single antenna 916.

Moreover, the smartphone 900 may include the antenna 916 provided for each wireless communication system. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to one another. The battery 918 supplies electric power to each block of the smartphone 900 shown in FIG. 21 via a feed line partially shown as a broken line in the drawing. For example, the auxiliary controller 919 causes a minimum necessary function of the smartphone 900 to be performed in a sleep mode.

One or more constituent elements (at least any one of the communication control unit 241, the information acquisition unit 243, the determination unit 245, or the notification unit 247) included in the processing unit 240 described with reference to FIG. 3 may be implemented in the wireless communication interface 912 in the smartphone 900 shown in FIG. 21. Alternatively, at least some of these constituent elements may be implemented in the processor 901 or the auxiliary controller 919. As an example, the smartphone 900 may be equipped with a module including a part (for example, the BB processor 913) or all of the wireless communication interface 912, the processor 901, and/or the auxiliary controller 919, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the smartphone 900 and executed by the wireless communication interface 912 (for example, the BB processor 913), the processor 901, and/or the auxiliary controller 919. As described above, the smartphone 900 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. 3 may be implemented in the wireless communication interface 912 (for example, the RF circuit 914) in the smartphone 900 shown in FIG. 21. In addition, the antenna unit 210 may be implemented on the antenna 916. Furthermore, the storage unit 230 may be implemented in the memory 902.

Second Application Example

FIG. 22 is a block diagram showing an example of a schematic configuration of a car navigation apparatus 920 to which the technology according to the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC. The processor 921 controls a navigation function and other functions of the car navigation apparatus 920. The memory 922 includes a RAM and a ROM, and stores data and a program to be executed by the processor 921.

The GPS module 924 uses GPS signals received from GPS satellites to measure the position (for example, latitude, longitude, and altitude) of the car navigation apparatus 920. The sensor 925 may include, for example, a group of sensors such as a gyro sensor, a geomagnetic sensor, and an atmospheric pressure sensor. The data interface 926 is connected to, for example, an onboard network 941 via a terminal (not shown), and acquires data such as vehicle speed data generated on the vehicle side.

The content player 927 reproduces content stored in a storage medium (for example, CD or DVD) inserted in the storage medium interface 928. The input device 929 includes, for example, a touch sensor for detecting a touch on a screen of the display device 930, and a button or switch, and accepts an operation or information input from a user. The display device 930 includes a screen such as an LCD or an OLED display, and displays a navigation image or an image of the content being reproduced. The speaker 931 outputs navigation sound or sound of the content being reproduced.

The wireless communication interface 933 supports any cellular communication system such as LTE or LTE-Advanced, and performs wireless communication. The wireless communication interface 933 may typically include a BB processor 934, an RF circuit 935, and the like. The BB processor 934 may perform, for example, coding/decoding, modulation/demodulation, multiplexing/demultiplexing, and the like. The BB processor 934 performs various signal processing for wireless communication. Meanwhile, the RF circuit 935 may include a mixer, a filter, an amplifier, and the like. The RF circuit 935 transmits and receives wireless signals via the antenna 937. The wireless communication interface 933 may be a one-chip module in which the BB processor 934 and the RF circuit 935 are integrated. The wireless communication interface 933 may include a plurality of the BB processors 934 and a plurality of the RF circuits 935 as shown in FIG. 22. Note that although FIG. 22 shows an example in which the wireless communication interface 933 includes the plurality of BB processors 934 and the plurality of RF circuits 935, the wireless communication interface 933 may include the single BB processor 934 or the single RF circuit 935.

Moreover, in addition to the cellular communication system, the wireless communication interface 933 may support another type of wireless communication system such as a near field communication system, a proximity wireless communication system, or a wireless LAN system. In that case, the wireless communication interface 933 may include the BB processor 934 and the RF circuit 935 for each wireless communication system.

Each of the antenna switches 936 causes a connection destination of the antenna 937 to switch between a plurality of circuits (for example, circuits for different wireless communication systems) included in the wireless communication interface 933.

Each of the antennas 937 includes a single or a plurality of antenna elements (for example, a plurality of antenna elements forming a MIMO antenna), and is used by the wireless communication interface 933 for transmitting and receiving wireless signals. The car navigation apparatus 920 may include a plurality of the antennas 937 as shown in FIG. 22. Note that although FIG. 22 shows an example in which the car navigation apparatus 920 includes the plurality of antennas 937, the car navigation apparatus 920 may include the single antenna 937.

Moreover, the car navigation apparatus 920 may include the antenna 937 provided for each wireless communication system. In that case, the antenna switch 936 may be omitted from the configuration of the car navigation apparatus 920.

The battery 938 supplies electric power to each block of the car navigation apparatus 920 shown in FIG. 22 via a feed line partially shown as a broken line in the drawing. Furthermore, the battery 938 stores electric power supplied from the vehicle side.

One or more constituent elements (at least any one of the communication control unit 241, the information acquisition unit 243, the determination unit 245, or the notification unit 247) included in the processing unit 240 described with reference to FIG. 3 may be implemented in the wireless communication interface 933 in the car navigation apparatus 920 shown in FIG. 22. Alternatively, at least some of these constituent elements may be implemented in the processor 921. As an example, the car navigation apparatus 920 may be equipped with a module including a part (for example, the BB processor 934) or all of the wireless communication interface 933 and/or the processor 921, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the car navigation apparatus 920 and executed by the wireless communication interface 933 (for example, the BB processor 934) and/or the processor 921. As described above, the car navigation apparatus 920 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. 3 may be implemented in the wireless communication interface 933 (for example, the RF circuit 935) in the car navigation apparatus 920 shown in FIG. 22. In addition, the antenna unit 210 may be implemented on the antenna 937. Furthermore, the storage unit 230 may be implemented in the memory 922.

Moreover, the technology according to the present disclosure may be implemented as an onboard system (or vehicle) 940 including one or more blocks of the car navigation apparatus 920 described above, the onboard network 941, and a vehicle-side module 942. In other words, the onboard system (or vehicle) 940 may be provided as an apparatus including at least any one of the communication control unit 241, the information acquisition unit 243, the determination unit 245, or the notification unit 247. The vehicle-side module 942 generates vehicle-side data such as vehicle speed, engine speed, or failure information, and outputs the generated data to the onboard network 941.

4. Conclusion

As described above, in the system according to the embodiment of the present disclosure, the base station 100 and the terminal apparatus 200 perform control such that data are transmitted to a transmission destination via at least any one of a plurality of channels shared in communication with each of a plurality of apparatuses. Furthermore, the base station 100 and the terminal apparatus 200 determine whether or not the plurality of channels is available for transmission of the same data. Then, the base station 100 and the terminal apparatus 200 performs control such that in a case where at least one of the plurality of channels has continued to be available for data transmission beyond a period set for the channel, data are transmitted by use of the channel.

The configuration as described above enables the base station 100 and the terminal apparatus 200 to more efficiently use the second channel shared among a plurality of apparatuses when transmitting data to a transmission destination in the system according to the present embodiment. Therefore, in the communication system according to the present embodiment, it is possible to improve the transmission efficiency of the entire system, and thus possible to implement low-delay and highly reliable communication in a more suitable manner.

Note that an example of the following case has been described above. On the basis of counter control according to the result of channel sensing, in a case where a corresponding channel has continued to be available for data transmission beyond a period set for the channel, data are transmitted by use of the channel. Meanwhile, the method based on the counter control is just an example. The method is not particularly limited as long as it is possible to determine whether or not a target channel has continued to be available for data transmission beyond a set period.

Furthermore, each detail of the description of the base station according to each embodiment described above can be similarly applied to, for example, a gNodeB (or gNB).

Although the preferred embodiment of the present disclosure has been described above in detail with reference to the accompanying drawings, the technical scope of the present disclosure is not limited to such an example. It will be apparent to a person having ordinary skill in the art of the present disclosure that various changes or modifications can be conceived within the scope of the technical idea described in the claims. It is understood that, of course, such changes or modifications are also within the technical scope of the present disclosure.

Furthermore, the effects described in the present specification are merely explanatory or illustrative, and not restrictive. That is, the technology according to the present disclosure can achieve other effects obvious to those skilled in the art from the description of the present specification, together with or instead of the above-described effects.

Note that the following configurations are also within the technical scope of the present disclosure.

(1)

A communication apparatus including:

a control unit that performs control such that data are transmitted to a transmission destination via at least any one of a plurality of channels shared in communication with each of a plurality of apparatuses; and a determination unit that determines whether or not the plurality of channels is available for transmission of the same data, in which the control unit performs control such that in a case where at least one of the plurality of channels has continued to be available for data transmission beyond a period set for the channel, data are transmitted by use of the channel.

(2)

The communication apparatus according to (1) above, in which the control unit decrements a counter value set for each of the plurality of channels on the basis of each of the determinations regarding the plurality of channels, and performs control such that in a case where the decremented counter value corresponding to a channel among the plurality of channels has become equal to or below a threshold, data are transmitted by use of the channel.

(3)

The communication apparatus according to (1) or (2) above, in which the determination unit determines whether or not each of the plurality of channels is available for data transmission according to a result of measurement of power in communication using each of the plurality of channels.

(4)

The communication apparatus according to any one of (1) to (3) above, in which the control unit performs control such that data are transmitted to a transmission destination via at least either a first channel or a second channel, the first channel being the channel, the second channel requiring no determination regarding availability for data transmission.

(5)

The communication apparatus according to (4) above, further including:

a notification unit that provides, to the transmission destination, notification concerning control information regarding communication using a plurality of the first channels, by using the second channel.

(6)

The communication apparatus according to (5) above, in which the control information includes information as to whether or not it is possible to perform communication via at least one of the plurality of first channels.

(7)

The communication apparatus according to (5) or (6) above, in which the control information includes information regarding the first channel.

(8)

The communication apparatus according to any one of (5) to (7) above, in which the control information includes information regarding an instruction that communication via at least one of the plurality of first channels be performed at the transmission destination.

(9)

The communication apparatus according to any one of (5) to (8) above, in which the control information includes information regarding the period set for the first channel.

(10)

The communication apparatus according to any one of (5) to (9) above, in which the control information includes information regarding a resource for transmitting data to the transmission destination.

(11)

The communication apparatus according to any one of (5) to (10) above, in which the control information includes information regarding priority set among the plurality of first channels.

(12)

The communication apparatus according to any one of (1) to (3) above, in which the communication apparatus is a base station, and the control unit performs control such that data are transmitted to a terminal apparatus.

(13)

The communication apparatus according to (11) above, in which at least one of the plurality of channels is an unlicensed band.

(14)

The communication apparatus according to any one of (1) to (3) above, in which the communication apparatus is a terminal apparatus, and the control unit performs control such that data are transmitted to a base station.

(15)

The communication apparatus according to (14) above, in which in a case where data are transmitted to the transmission destination via at least one of the plurality of channels, the control unit arbitrarily selects a resource to be used for transmitting the data from among a plurality of resources allocated to the channel, the plurality of resources being specified by frequencies and time available for data transmission.

(16)

A communication method to be performed by a computer, including:

performing control such that data are transmitted to a transmission destination via at least any one of a plurality of channels shared in communication with each of a plurality of apparatuses;

determining whether or not the plurality of channels is available for transmission of the same data; and performing control such that in a case where at least one of the plurality of channels has continued to be available for data transmission beyond a period set for the channel, data are transmitted by use of the channel.

(17)

A program for causing a computer to perform functions of:

performing control such that data are transmitted to a transmission destination via at least any one of a plurality of channels shared in communication with each of a plurality of apparatuses;

determining whether or not the plurality of channels is available for transmission of the same data; and performing control such that in a case where at least one of the plurality of channels has continued to be available for data transmission beyond a period set for the channel, data are transmitted by use of the channel.

REFERENCE SIGNS LIST

1 System
100 Base station
110 Antenna unit
120 Wireless communication unit
130 Network communication unit
140 Storage unit
150 Processing unit
151 Communication control unit
153 Information acquisition unit
155 Determination unit
157 Notification unit
200 Terminal apparatus 210 Antenna unit
220 Wireless communication unit
230 Storage unit
240 Processing unit
241 Communication control unit
243 Information acquisition unit
245 Determination unit
247 Notification unit

The invention claimed is:

1. A communication apparatus comprising:
a transceiver; and
control circuitry operatively connected to the transceiver and configured to:
determine whether or not a plurality of channels is available for transmission of same data;
perform a channel access procedure independently on each of the plurality of channels, the channel access procedure performed independently on each of the plurality of channels comprising steps (0) through (7) as follows:
step (0)—performing channel sensing, and, in a case where the channel sensing indicates idle in a first slot duration within a first defer period, proceeding to step (1), otherwise, proceeding to step (6);
step (1)—acquiring a channel-specific counter initial value, setting an initial value of a channel-specific counter N to the acquired channel-specific counter initial value, and proceeding to step (2),
wherein the channel-specific counter initial value is an integer between 0 and a contention window (CW), including 0 and the CW;
step (2)—in a case where a value of the channel-specific counter N of one of the plurality of channels is larger than 0 and where a channel specific counter N of another channel of the plurality of channels does not indicate 0, decrementing the channel-specific counter N of each of the plurality of channels by 1, and proceeding to step (3), otherwise, if the channel specific counter N of the another channel indicates 0, proceed to step (7);
step (3)—adding a slot to the first defer period, shifting to a standby state, and performing channel sensing in the slot added to the first defer period, and, in a case where the slot added to the first defer period is idle, proceeding to step (4), otherwise, in a case where the slot added to the first defer period is not idle proceeding to step (5);
step (4)—in a case where the decremented channel specific counter N of the one channel indicates 0 and the decremented channel specific counter N of the another channel does not indicate 0, transmitting the data on the one channel, discarding any data for the another channel, and ending the channel access procedure, otherwise, in a case where the channel specific counter N of both the one channel and the another channel indicates a value greater than 0, return to step (2);
step (5)—while in the standby state, performing additional channel sensing until it is detected that any slot added to the first defer period is busy, or until all slots added to the first defer period are idle, and proceeding to step (6);
step (6)—in a case where all slots added to the first defer period are idle, proceeding to step (4), otherwise, if any slot added to the first defer period is busy, returning to step (5); and
step (7)—in a case where the channel specific counter N of the another channel indicates 0 earlier than the channel specific counter N of the one channel, transmit the data on the another channel and discard the data to be transmitted on the one channel,
wherein the control circuitry provides via a second channel, to the transmission destination, notification concerning control information regarding communication using a first channel, wherein the first channel is the one channel or the another channel, and wherein the second channel requiring no determination regarding availability for data transmission.

2. The communication apparatus according to claim 1, wherein the control circuitry determines whether or not either of the first channel or the second channel is available for data transmission according to a result of a corresponding power measurement.

3. The communication apparatus according to claim 1, wherein the control information includes information as to whether or not it is possible to perform communication via the first channel.

4. The communication apparatus according to claim 1, wherein the control information includes information regarding the first channel.

5. The communication apparatus according to claim 1, wherein the control information includes information regarding an instruction that communication via the first channel be performed at the transmission destination.

6. The communication apparatus according to claim 1, wherein the control information includes information regarding a period set for the first channel.

7. The communication apparatus according to claim 1, wherein the control information includes information regarding a resource for transmitting the data to the transmission destination.

8. The communication apparatus according to claim 1, wherein the control information includes information regarding a priority set for the first channel.

9. The communication apparatus according to claim 1, wherein
the communication apparatus is a base station, and
the control circuitry performs control such that the data is transmitted to a terminal apparatus.

10. The communication apparatus according to claim 1, wherein
the communication apparatus is a terminal apparatus, and
the control circuitry performs control such that the data is transmitted to a base station.

11. The communication apparatus according to claim 10, wherein the control circuitry arbitrarily selects a resource to be used for transmitting the data from among a plurality of allocated channel resources, the plurality of allocated channel resources being specified by frequencies and times available for transmission of the data.

12. The communication apparatus of claim 1, wherein the first defer period includes a third latency period, the third latency period including a second latency followed by a number of consecutive slots, the second latency including a slot added before a first latency, the first latency consisting of a slot, wherein the number of consecutive slots corresponds to a priority class for a quality of service (QoS).

13. A communication method to be performed by a communication device, the method comprising:
determining whether or not a plurality of channels is available for transmission of same data;
performing a channel access procedure independently on each of the plurality of channels, the channel access procedure performed independently on each of the plurality of channels comprising steps (0) through (7) as follows:

step (0)—performing channel sensing, and, in a case where the channel sensing indicates idle in a first slot duration within a first defer period, proceeding to step (1), otherwise, proceeding to step (6);

step (1)—acquiring a channel-specific counter initial value, setting an initial value of a channel-specific counter N to the acquired channel-specific counter initial value, and proceeding to step (2), wherein the channel-specific counter initial value is an integer between 0 and a contention window (CW), including 0 and the CW;

step (2)—in a case where a value of the channel-specific counter N of one of the plurality of channels is larger than 0 and where a channel specific counter N of another channel of the plurality of channels does not indicate 0, decrementing the channel-specific counter N of each of the plurality of channels by 1, and proceeding to step (3), otherwise, if the channel specific counter N of the another channel indicates 0, proceed to step (7);

step (3)—adding a slot to the first defer period, shifting to a standby state, and performing channel sensing in the slot added to the first defer period, and, in a case where the slot added to the first defer period is idle, proceeding to step (4), otherwise, in a case where the slot added to the first defer period is not idle proceeding to step (5);

step (4)—in a case where the decremented channel specific counter N of the one channel indicates 0 and the decremented channel specific counter N of the another channel does not indicate 0, transmitting the data on the one channel, discarding any data for the another channel, and ending the channel access procedure, otherwise, in a case where the channel specific counter N of both the one channel and the another channel indicates a value greater than 0, return to step (2);

step (5)—while in the standby state, performing additional channel sensing until it is detected that any slot added to the first defer period is busy, or until all slots added to the first defer period are idle, and proceeding to step (6);

step (6)—in a case where all slots added to the first defer period are idle, proceeding to step (4), otherwise, if any slot added to the first defer period is busy, returning to step (5); and step (7)—in a case where the channel specific counter N of the another channel indicates 0 earlier than the channel specific counter N of the one channel, transmit the data on the another channel and discard the data to be transmitted on the one channel, wherein the method further comprises providing via a second channel, to the transmission destination, notification concerning control information regarding communication using a first channel, wherein the first channel is the one channel or the another channel, and wherein the second channel requiring no determination regarding availability for data transmission.

14. The method of claim 13, wherein the first defer period includes a third latency period, the third latency period including a second latency followed by a number of consecutive slots, the second latency including a slot added before a first latency, the first latency consisting of a slot, wherein the number of consecutive slots corresponds to a priority class for a quality of service (QoS).

15. A non-transitory computer-readable program product containing instructions for causing a communication device to perform a method, the method comprising:

determining whether or not a plurality of channels is available for transmission of same data;

performing a channel access procedure independently on each of the plurality of channels, the channel access procedure performed independently on each of the plurality of channels comprising steps (0) through (7) as follows:

step (0)—performing channel sensing, and, in a case where the channel sensing indicates idle in a first slot duration within a first defer period, proceeding to step (1), otherwise, proceeding to step (6);

step (1)—acquiring a channel-specific counter initial value, setting an initial value of a channel-specific counter N to the acquired channel-specific counter initial value, and proceeding to step (2), wherein the channel-specific counter initial value is an integer between 0 and a contention window (CW), including 0 and the CW;

step (2)—in a case where a value of the channel-specific counter N of one of the plurality of channels is larger than 0 and where a channel specific counter N of another channel of the plurality of channels does not indicate 0, decrementing the channel-specific counter N of each of the plurality of channels by 1, and proceeding to step (3), otherwise, if the channel specific counter N of the another channel indicates 0, proceed to step (7);

step (3)—adding a slot to the first defer period, shifting to a standby state, and performing channel sensing in the slot added to the first defer period, and, in a case where the slot added to the first defer period is idle, proceeding to step (4), otherwise, in a case where the slot added to the first defer period is not idle proceeding to step (5);

step (4)—in a case where the decremented channel specific counter N of the one channel indicates 0 and the decremented channel specific counter N of the another channel does not indicate 0, transmitting the data on the one channel, discarding any data for the another channel, and ending the channel access procedure, otherwise, in a case where the channel specific counter N of both the one channel and the another channel indicates a value greater than 0, return to step (2);

step (5)—while in the standby state, performing additional channel sensing until it is detected that any slot added to the first defer period is busy, or until all slots added to the first defer period are idle, and proceeding to step (6);

step (6)—in a case where all slots added to the first defer period are idle, proceeding to step (4), otherwise, if any slot added to the first defer period is busy, returning to step (5); and step (7)—in a case where the channel specific counter N of the another channel indicates 0 earlier than the channel specific counter N of the one channel, transmit the data on the another channel and discard the data to be transmitted on the one channel, wherein the method further comprises providing via a second channel, to the transmission destination, notification concerning control information regarding communication using a first channel, wherein the first channel is the one channel or the another channel, and wherein the second channel requiring no determination regarding availability for data transmission.

16. The non-transitory computer-readable program product of claim 15, wherein the first defer period includes a third latency period, the third latency period including a second latency followed by a number of consecutive slots, the second latency including a slot added before a first latency, the first latency consisting of a slot, wherein the number of consecutive slots corresponds to a priority class for a quality of service (QoS).

* * * * *